(12) United States Patent
Castelli et al.

(10) Patent No.: US 7,930,476 B1
(45) Date of Patent: Apr. 19, 2011

(54) APPLICATION AWARE STORAGE RESOURCE PROVISIONING

(75) Inventors: Brian Castelli, Fuquay-Varina, NC (US); Andreas L. Bauer, Boxborough, MA (US); Mark A. Parenti, Milford, NH (US); Stephen J. Todd, Shrewsbury, MA (US); Douglas A. Wood, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 660 days.

(21) Appl. No.: 12/005,679

(22) Filed: Dec. 28, 2007

(51) Int. Cl.
*G06F 12/00* (2006.01)
(52) U.S. Cl. . 711/114; 711/163; 711/170; 711/E12.103; 709/225; 709/226
(58) Field of Classification Search .......... None
See application file for complete search history.

(56) References Cited

U.S. PATENT DOCUMENTS
2006/0101204 A1* 5/2006 Bao ............... 711/114

OTHER PUBLICATIONS

U.S. Appl. No. 12/005,787, Castelli, et al.
U.S. Appl. No. 12/005,717, Castelli, et al.
U.S. Appl. No. 11/824,578, Gupta, et al.

* cited by examiner

*Primary Examiner* — Reginald G Bragdon
*Assistant Examiner* — Baboucarr Faal
(74) *Attorney, Agent, or Firm* — Muirhead and Saturnelli, LLC

(57) ABSTRACT

Described are techniques for provisioning storage of a data storage system for use by an application. One or more application provision requirements associated with a provisioning request to provision storage for use by the application are received. The one or more application provision requirements are translated, in accordance with application best practices for the application included in a policy, to one or more generic storage resource requirements. The one or more generic storage resource requirements are translated, in accordance with data storage system best practices included in said policy, to one or more physical data storage requirements. The physical data storage requirements include identification of one or more physical storage devices in said data storage system used in allocating storage to service said provisioning request. Storage is allocated for use by said application in accordance with said physical data storage requirements.

20 Claims, 11 Drawing Sheets

APPLICATION AWARE STORAGE RESOURCE PROVISIONING

BACKGROUND

1. Technical Field

This application generally relates to data storage, and more particularly to techniques used for data storage configuration and provisioning for use with different applications.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration and provisioning tasks. Such tasks may include, for example, configuring and provisioning storage for use with an email application. Tasks may include allocating storage, specifying the logical and/or physical devices used for the storage allocation, specifying whether the data should be replicated, the particular RAID (Redundant Array of Independent or Inexpensive Disks) level, and the like. With such options in connection with performing configuration and provisioning tasks, a customer may not have the appropriate level of sophistication and knowledge needed.

Thus, it may be desirable to utilize a flexible technique which assists customers in connection with performing data storage management tasks such as related to data storage configuration and provisioning. It may be desirable that the technique be adaptable to the particular knowledge level of the user to provide for varying degrees of automation of data storage configuration and provisioning in accordance with best practices that may vary with the underlying data storage system and application.

SUMMARY OF THE INVENTION

In accordance with one aspect of the invention is a method for provisioning storage of a data storage system for use by an application comprising: receiving one or more application provision requirements associated with a provisioning request to provision storage for use by the application; translating, in accordance with application best practices for the application included in a policy, the one or more application provision requirements to one or more generic storage resource requirements; translating, in accordance with data storage system best practices included in said policy, the one or more generic storage resource requirements to one or more physical data storage requirements, wherein said physical data storage requirements include identification of one or more physical storage devices in said data storage system used in allocating storage to service said provisioning request; and allocating storage for use by said application in accordance with said physical data storage requirements. The policy may include a different set of data storage system best practices for each type of data storage system from which storage can be provisioned. The policy may include a different set of application best practices for each application for which storage can be provisioned. The one or more application provision requirements may vary in accordance with a user proficiency level. The policy may include a first set of one or more application provision requirements associated with a first proficiency level and a second set of one or more application provision requirements associated a second proficiency level. The first proficiency level may be associated with a greater knowledge level that said second proficiency level and may provide a finer granularity of control in connection with said provisioning request. The step of translating the one or more application provision requirements to one or more generic storage resource requirements may use a first set of application best practices when said provisioning request is for provisioning storage for said first application, and uses a second set of application best practices when said provisioning request is for provisioning storage for said second application, and wherein said translating the one or more generic storage resource requirements to one or more physical data storage requirements may use a first set of data storage system best practices when said provisioning request is to provision storage for said first application or said second application. The policy may be a codified implementation of best practices for one or more different applications and one or more different types of data storage systems. The one or more applications may include one or more of an email application, a database application, an application which is customized for a particular vertical market, a spreadsheet application, a presentation application, a word processor application, a web server application, and virtualization software. The policy may include a plurality of user proficiency levels each associated with a different set of one or more application provision requirements, said policy mapping each of said different set of one or more application provision requirements to said generic storage resource requirements and providing a different degree of automation of processing said provisioning request in accordance with a user proficiency level associated with said each set of application provision requirements. The application provision requirements may use application-specific terminology associated with said application. The method may also include: detecting, by the data storage system, availability of a new policy at one of an external network location or a local device of the data storage system; and copying the new policy to the data storage system. The method may also include: determining one or more candidate solutions expressed in terms of generic storage resource requirements; analyzing currently available storage in said data storage system in accordance with said one or more candidate solutions; determining which of said one or more candidate solutions can be implemented using said currently available storage; and selecting one of said one or more candidate solutions for implementation to allocate storage for said provisioning request. The method may also include: determining a ranking of said one or more candidate solutions, said ranking indicating a level of fitness associated with each of said one or more candidate solutions that can be implemented. The step of selecting may be performed automatically without user interaction in accordance with a specified setting used in the data storage system. The step of selecting may include: displaying information regarding which of said one or more solutions can be implemented along with information regarding said ranking; and selecting via a user interface one of said solutions for implementation.

In accordance with another aspect of the invention is a computer readable medium comprising executable code stored thereon for provisioning storage of a data storage system for use by an application, the computer readable medium comprising executable code for: receiving one or more application provision requirements associated with a provisioning request to provision storage for use by the application; translating, in accordance with application best practices for the application included in a policy, the one or more application provision requirements to one or more generic storage resource requirements; translating, in accordance with data storage system best practices included in said policy, the one or more generic storage resource requirements to one or more physical data storage requirements, wherein said physical data storage requirements include identification of one or more physical storage devices in said data storage system used in allocating storage to service said provisioning request; and allocating storage for use by said application in accordance with said physical data storage requirements. The policy may include a different set of data storage system best practices for each type of data storage system from which storage can be provisioned. The policy may include a different set of application best practices for each application for which storage can be provisioned. The one or more application provision requirements may vary in accordance with a user proficiency level and the policy may include a first set of one or more application provision requirements associated with a first proficiency level and a second set of one or more application provision requirements associated a second proficiency level.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
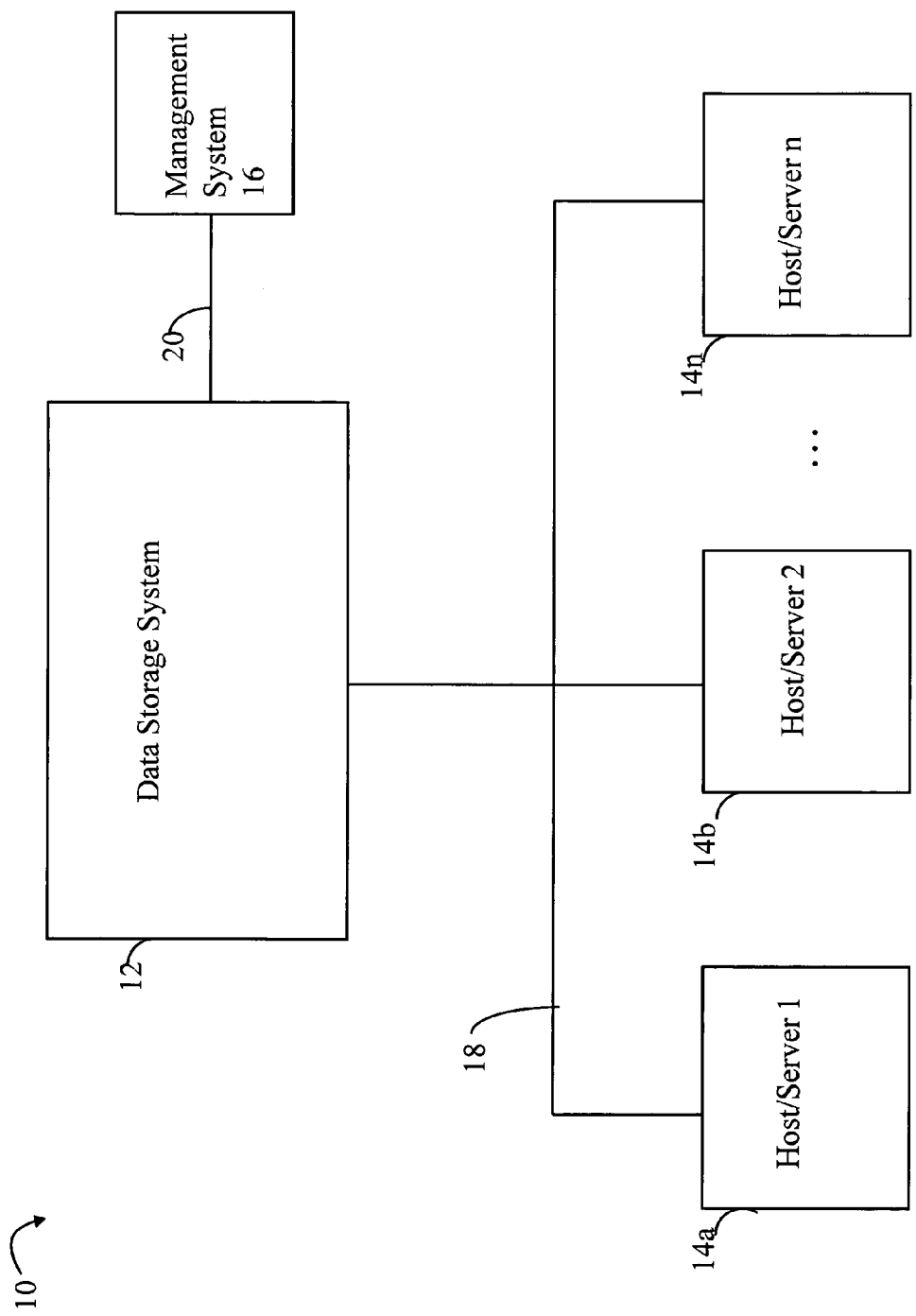
FIG. 1 is an example of an embodiment of a system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example in connection with an email application server component that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage request to provision or configure data storage.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in following paragraphs are techniques that may be used to assist customers of a data storage system in connection with performing data storage system management tasks such as related to data storage system configuration, provisioning of data storage, and the like. The techniques herein are adaptable to the particular knowledge level of the user. The techniques are flexible and allow for implementation of best practices and defaults in an automated fashion which are customized for the particular application, user or customer, and/or underlying data storage system and environment to meet specific customer needs. As will be described in more detail, depending on the level at which a user interacts with the data storage system, different levels or amounts of automation of the best practices may be performed. Depending on how the data storage system is configured, the user may elect to bypass the automation of best practices or limit the amount of automation performed by interacting with the system at various levels. User proficiency levels and exemplary embodiments are described in more detail in U.S. patent application Ser. No. 11/824,578, filed Jun. 29, 2007, APPLICATION AWARE STORAGE, which is incorporated by reference herein.

What will be described herein are techniques that may be used in connection with performing data storage configuration and provisioning of the data storage in connection with a request, for example, to allocate a portion of data storage for use with an application hosting data on a data storage system.

Figure 2:
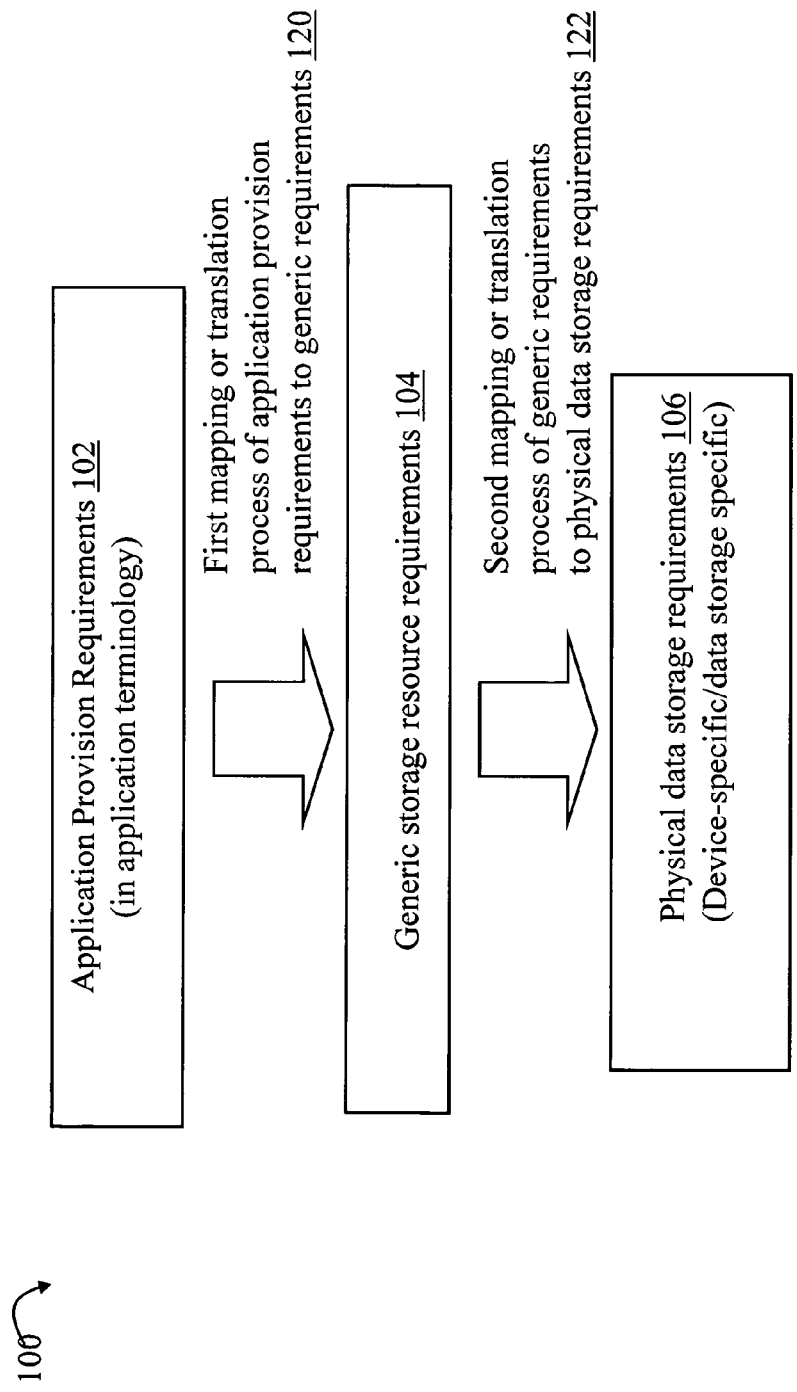
FIG. 2 is an example representation of the mapping or translation processes that may be performed in an embodiment in accordance with the techniques herein.

Referring to FIG. 2, shown is an example representation of the processing that may be performed in an embodiment in accordance with the techniques herein. The example 100 illustrates the processing that may be performed in connection with a request to provision storage of a data storage system for use by an application. For example, a provisioning request may be made to allocate storage for a number of mailboxes for use by an email application. The example 100 includes application provision requirements 102 which may be mapped or translated into generic storage resource requirements 104 in a first mapping or translation stage 120. The generic storage resource requirements 104 may be mapped or translated into physical storage requirements 106 in a second mapping or translation stage 122. The mapping stage 120 may be performed in accordance with application best practices. The steps comprising stage 120 may vary with each application. The mapping stage 122 may be performed in accordance with data storage specific best practices. The steps comprising stage 122 may vary with the particular underlying data storage system.

The application best practices implemented as part of 120 in an embodiment may be determined based on experience, know how, testing and the like, in connection with provisioning storage for a particular application. The data storage specific best practices implemented as part of 122 in an embodiment may be based on experience, know-how, testing, and the like, in connection with provisioning and configuring storage for a particular data storage system. To illustrate, the mapping performed in the first stage 120 may vary with a particular email application, database application, and the like. A different set of processing steps may be performed for each of the foregoing applications in accordance with the application best practices of each application. The mapping performed in the second stage 122 may vary with each data storage system provided by a same vendor or different vendor. For example, EMC Corporation provides the Symmetrix® data storage system and the CLARiiON® data storage system. A different set of processing steps may be performed for each of the foregoing data storage systems in accordance with data storage system specific best practices in connection with the second stage 122. Both the application best practices and data storage system specific best practices may be codified in accordance with techniques herein to provide for automatically provisioning data storage system resources. An embodiment utilizing the techniques herein may implement the application and data storage system best practices using executable code which is executed on the data storage system when processing a request to provision storage and/or configure storage for use with the techniques herein. As will be described in more detail herein, the best practices may be codified using any one of a variety of different techniques known in the art such as, for example, using a script language, rules, programming language, and the like. Although reference may be made to particular ways in which the techniques herein may be implemented for purposes of example and illustration, such reference should not be construed as a limitation of the techniques herein.

Each of the different requirements 102, 104 and 106 and the two mapping stages 120 and 122 will now be described in more detail.

The application provision requirements 102 may specify the one or more provisioning requirements for a request. The requirements may make reference to application-specific terminology. The application provision requirements 102 may be the user inputs for the provisioning request received via a user interface (UI) using any one of a variety of different supported interfaces and techniques. The application provision requirements 102 may vary with user level and/or particular application for which the provisioning request is issued.

In one embodiment, the UI may provide for one or more different types of user interfaces and associated data. For example, the UI may provide support for a graphical user interface (GUI), command line interface (CLI), and the like. As also described herein, one or more different user levels may be provided in accordance with different levels of user proficiency. A user may interact with a system utilizing the techniques herein at any one of the user proficiency levels. The application provision requirements 102 may vary with each of the different user proficiency levels of interaction that may be provided in an embodiment. Each of the different user levels may provide a different logical view and level of abstraction with respect to a data storage task to be performed for an application executing on one of the hosts. Each of the different user levels may provide a different level of detail with respect to the underlying operations and tasks performed on the data storage system in accordance with different levels of user sophistication and knowledge. The language or terminology of the UI and application provision requirements 102, UI data (e.g., content or data used to populate the UI menus), and UI presentation or structure (e.g., commands presented or particular hierarchical menu structure) may vary in accordance with the particular user level at which a user interacts with the data storage system as well as the application for which the provisioning request is being performed. Thus, a user may interact with the data storage system at a variety of different levels when issuing data storage configuration requests for the same application. The UI and application provision requirements may be customized for the particular level and application for which the request is performed.

In an embodiment, the application provision requirements 102 may be characterized as a set of application-specific requirements that may vary depending on the target user and associated user level at which the user may interact with the system. Thus, the application provision requirements 102 obtained in connection with a UI may vary with the user level and application. As described in more detail in following paragraphs, each user level may provide a different user interface and set of application provision requirements 102 for a different level of user interaction and level of knowledge and sophistication. Each user level may also be associated with a different level of automation of the application best practices, for example, with users interacting at a NOVICE level obtaining the greatest amount of automation of application best practices with an appropriate level of abstraction, and users interacting at other levels, such as INTERMEDIATE and EXPERT, obtaining a different appropriate level of abstraction and automation with respect to application best practices.

For example, a NOVICE user level may provide a beginner or most simplistic view of the data storage system and tasks performed for data storage configuration and provisioning in accordance with application best practices. NOVICE user level interactions require the least amount of knowledge and may be geared toward interacting with users having minimal knowledge when performing a data storage configuration or provisioning request by providing the greatest level of abstraction of the underlying system and operations performed. The language may be more non-technical in comparison to the interface language of other levels. As the user level increases (e.g., to INTERMEDIATE or EXPERT), so does the assumed level of knowledge of the user in connection with interactions. An EXPERT user level may be utilized by the most knowledgeable users providing a greatest granularity of control of all user levels in connection with a data provisioning request. The EXPERT user level may expose more detailed information to the user than interactions at NOVICE and INTERMEDIATE levels. As an example, a NOVICE level user may issue a request to provision storage for a number of mailboxes for storing data of an email application executing on one of the hosts. The NOVICE user may specify a minimal amount of information in connection with the request such as a number of mailboxes. A user may interface with the data storage system using a GUI and issue the data storage provision request. The language and terminology of user interactions via the GUI may be customized for the NOVICE user level of the email application. In connection with the same email application, a more knowledgeable user may choose to issue a data storage provision request via a GUI for a same number of mailboxes by interacting with the data storage system at an INTERMEDIATE or EXPERT level. For example, an EXPERT user level may provide a more detailed information about the request regarding the underlying data storage device and how this data storage device is used by the application. To further illustrate, the EXPERT level data storage provision request may specify additional application-specific information, the physical and/or logical devices upon which storage is allocated, provide vendor-specific or data storage-specific attributes or settings, indicate a number and type of files or data storage volumes created, and the like, that may vary with application for which storage is being provisioned. In connection with the type of file or volume for which storage is allocated, this may be particular to the email application. A file may be a database or a log file. The log files are used to keep a record of transactions taking place and may be used in connection with recovery operations. The database files hold mailbox stores such as email data. In connection with the NOVICE user level, the user may simply input a number of mailboxes and may omit additional detail such as specification of a number and size of database storage volumes, log volumes, and the like, as may be specified with an EXPERT level. For the NOVICE user level, such details may be specified as part of the mapping process 120 which maps the application provision requirements 102, that may vary with user level, to generic storage requirements 104. The defaults and other details in connection with the first mapping or translation stage 120 may be customized for the particular application in accordance with application best practices.

The application provision requirements 102 may be mapped in the first mapping or translation stage 120 to generic resource requirements in accordance with application best practices. Additionally, the first mapping or translation stage 120 may generate other output, such as application-specific information including application-specific attributes. The application-specific information may not be used in connection with the specifying generic storage resource requirements or otherwise involved in the second mapping or translation process. The application-specific information, and possible uses thereof, are described in more detail below. The application best practices may be a codified instance of 120 for each application. The generic storage resource requirements 104 may be characterized as an expression of the provisioning request in terms of application-neutral or application independent data elements and application independent data element properties. The generic storage requirements 104 refer to data elements that may be used as a common way of expressing the storage requirements for many different applications. In contrast, the application provision requirements 102 may make reference to data elements which are application-specific such as a number of mailboxes. The application-specific requirements of 102, such as number of mailboxes, may be translated by 120 into application independent data elements that may be used as an intermediate expression of storage requirements for a provisioning request. As will be described in more detail in following paragraphs, generic storage requirements may refer to generic storage pools of storage volumes configured for use with servicing different application provisioning requests. For example, a storage pool of FAST storage may be defined. FAST storage may be defined as a general category of "fast" storage based on one or more different data storage system-specific properties which are used to characterize the storage pool and are used as part of the second mapping stage 122. Such data storage specific properties may not be expressly or specifically included in the generic storage resource requirements 104. Rather, the generic requirements of 104 may reference an abstract data storage element property of FAST based on one or more underlying data storage specific attributes. The particular properties and associated values used to define a FAST storage pool as well as other storage pools may vary with the underlying data storage system and associated data storage system best practices. A portion of storage from one of the storage pools, such as a volume or portion thereof, may be used in specifying generic data storage resource requirements 104. As another example, an embodiment may define one or more CHEAP storage pools along with one or more FAST storage pools for use in connection with specifying generic resource requirements 104. As with FAST storage pools, CHEAP may be an abstract data storage element property based on one or more data storage specific properties and values that vary with the underlying data storage system. The particular properties and values used to characterize and define a CHEAP storage pool may vary with data storage system and associated data storage system best practices. CHEAP may refer to a second type of data storage which may be characterized as inexpensive and not as fast in connection with servicing I/O requests relative to the storage pools of type FAST. In contrast to CHEAP storage pools, storage pools of type FAST may consist of faster device types and device configurations which may typically result in faster I/O request service times. Other embodiments may use a different number and different types or categories of storage pools other than FAST and CHEAP. In one embodiment as described herein, the generic storage resource requirements may be expressed in terms of generic data storage elements, such as storage pools and portions thereof, having one generic data storage element properties, such as FAST or CHEAP.

As described above, the first mapping or translation stage 120 may output generic storage resource requirements and also application-specific information or application specific attributes. The application-specific information may be characterized as additional attributes associated with the generic storage resource requirements but which are not used in connection with the second mapping stage 122. The generic storage resource requirements are mapped in the second mapping stage 122, but not the application-specific information is not utilized. The application-specific information may be used to provide additional information regarding the generic provisioned storage for other purposes. For example, the application-specific information may be used in connection with further annotating provisioned storage and presenting the information to a user. The application-specific information may be used in annotating other information maintained and used for other purposes than the second mapping stage 122 as described herein. For example, the application-specific information may include application-specific attributes associated with data objects of a data model used in presenting information on currently allocated and provisioned storage to the user. As such, the first mapping stage 120, in addition to producing the generic storage resource requirements, may produce other types of outputs used in connection with other processing operations, tasks, and data models.

The generic storage resource requirements 104 may be mapped by the second mapping or translation stage 122 into physical data storage requirements 106. The requirements 106 may vary with the particular type of data storage system (e.g., different data storage system by same or different vendor), customer's configuration and data storage environment (e.g., which data storage system types, number of each, vendor), number and type of devices on each data storage system (e.g., disks, disk or other device characteristics such as capacity, number of disks), and the like. The requirements 106 identify data storage system resources used in connection with implementing or fulfilling a request to provision storage for use by the application. Such resources may include the one or more physical devices from which storage is allocated for use in storing data and any parity information. In an embodiment in which the data storage system is a multiprocessor architecture, a designated processor of the data storage system may be assigned to service I/O requests for one or more portions of the allocated storage. The processing of stage 122 maps the generic requirements of 104 in accordance with the different data storage specific properties that may be associated with each storage pool to the physical resources of the data storage system. As an example, each storage pool may be formed from one or more different RAID groups of physical devices. A provision request for a volume of storage in a storage pool is mapped to a portion of physical storage in accordance with the data storage best practices codified in 122. With reference to the generic storage requirements 104 that may refer to a volume in a FAST or CHEAP storage pool, data storage system best practices may determine how FAST and CHEAP are defined for each type of data storage system.

In connection with the techniques herein, an embodiment implementing application best practices does not have to have any knowledge regarding the underlying data storage system and data storage system best practices. In other words, the application best practices and the data storage best practices may be developed independently of one another in accordance with the techniques herein. As a result, an instance of an application best practice implemented as part of 120 may be used with any one or more different implementations of data storage best practices of 122. Similarly, an instance of data storage best practices 122 may be used with any one or more different implementations of application best practices of 120 for different applications.

Thus, using the techniques herein, an embodiment may define a first FAST storage pool and a first CHEAP storage pool using data storage on a Symmetrix® data storage system. The embodiment may also define a second FAST storage pool and a second CHEAP storage pool using data storage on a CLARiiON® data storage system. A same application may host data storage using the techniques herein on both the CLARiiON® data storage system and the Symmetrix® data storage system. A first code module, such as a first script, may be used to perform the first mapping stage 120 in accordance with the application best practices. A second code module, such as a second script, may be used to perform data storage specific mapping of 122 for the Symmetrix® data storage system. A third code module, such as a third script, may be used to perform data storage specific mapping of 122 for the CLARiiON® data storage system. Both the second and third scripts may be used with the first script in an embodiment in accordance with the techniques herein.

To further illustrate with respect to FIG. 2, the application provision requirements may have an application-specific focus and provide a level of abstraction customized for an application such as, for example, a particular email application, law office application or medical office application, as well as a class of related applications, such as a multiple email applications. The application provision requirements may vary with the particular application as well as user level. The interface language may vary with the application. For example, if the application is a law office application, the interface language, menu options, and the like, may be tailored to the law profession and particular law office application. Similarly, a medical office application may utilize an interface language, menu options, and the like, familiar to the medical office and for the particular medical application. As such, the first mapping or translation step 120 may use one set of rules, mappings, script, and the like, for each application to implement the application specific best practices for the one or more provided user levels. For example, a first script for the medical office application may be used to map the user input parameters using medical office terminology to the generic storage requirements 104. A second script for the law office application may be used to map the user input parameters using law office terminology to generic storage resource requirements 104. The user connecting to the data storage system may be provided with a UI customized for the selected level and application to perform a requested data storage configuration. The requirements 102 obtained using the UI may vary with the user level.

The generic storage resource requirements 104 may not be tailored for any particular application. In other words, the generic storage resource requirements specifies a common terminology (e.g., data elements, model, properties, etc.) for expressing provision requests for multiple applications such as the medical application, law office application, email application, database application, and the like. The requirements 104 are mapped to physical data storage requirements 106 using second mapping or translation processing defined by data storage system best practices codified as part of 122. The physical data storage system requirements 106 may be customized for the particular storage vendor and associated options. For example, the requirements 106 may be specified in terms of particular physical data storage devices and attributes, RAID levels and techniques, SCSI and iSCSI terminology, vendor-specific options, and the like. The best practices and the automation of the best practices as described in more detail in following paragraphs may be customized for a particular application and the particular data storage system and environment.

A policy may be defined in an embodiment in accordance with the best practices for applications and data storage systems. A policy may be characterized as an instantiation of the application practices and/or data storage system best practices in an embodiment. A policy including application best practices may specify defaults used in connection with the different user levels for one or more applications. For example, for an email application, the policy may specify a default amount of mailbox data storage capacity and log storage capacity for each mailbox or group of mailboxes, may indicate that mailbox data is stored on FAST storage and that log data is stored on CHEAP storage, and may also specify other application independent or application-neutral criteria that may be used in servicing the provisioning request. The other criteria may include whether the data storage for the application should be allowed to share a RAID group with a different application thus affecting I/O performance, whether the storage needs to be expandable for use with the application's future storage needs, an expansion factor or amount indicating a threshold minimum amount of available storage for use with future data storage needs of the application, and the like. A policy including data storage system best practices may define CHEAP and FAST for each type of data storage system. For example, an embodiment may specify a data storage system best practices policy for a first type of data storage system in which FAST is defined as using Fibre Channel drives, a RAID-10 configuration of device pairs, and assigning servicing of I/O requests by a particular data storage system service processor since the first type of data storage system is a multi-processor architecture. For a second type of data storage system, FAST may be defined as using Fibre channel drives, and a RAID-5 (4 data drives+1 parity drive) configuration. The second type of data storage system does not include multiple data storage system service processors for servicing I/O requests thus no data storage service processor assignment is made. If the second type of data storage system does not support use of Fibre channel drives but rather uses a different form of storage or other device having high speed performance characteristics, then such a device may be specified rather than the Fibre channel devices. Different elements that may be included in a policy are described herein in more detail.

The physical storage devices of the data storage system may be configured or partitioned into storage pools for use in connection with specifying generic requirements of 104. An embodiment may form one or more such storage pools for use in connection with servicing a provisioning request prior to the issuance of the provisioning request. In other words, the physical storage devices may be configured into one or more storage pools at a first point in time. At a second later point in time, storage may be allocated from the previously formed storage pools in connection with a provisioning request to allocate storage for use with an application hosting data on the data storage system. As will be described in more detail herein, storage pools may be formed at different points in time in connection with the life cycle of a data storage system and a defined policy. For example, storage pools may be formed as part of data storage system initialization and startup processing and when new data storage devices are added to a data storage system. An embodiment may also form storage pools as part of processing in response to receiving a provisioning request. Examples of the foregoing and different variations of how and when storage pools may be formed are described in more detail herein.

Figure 3:
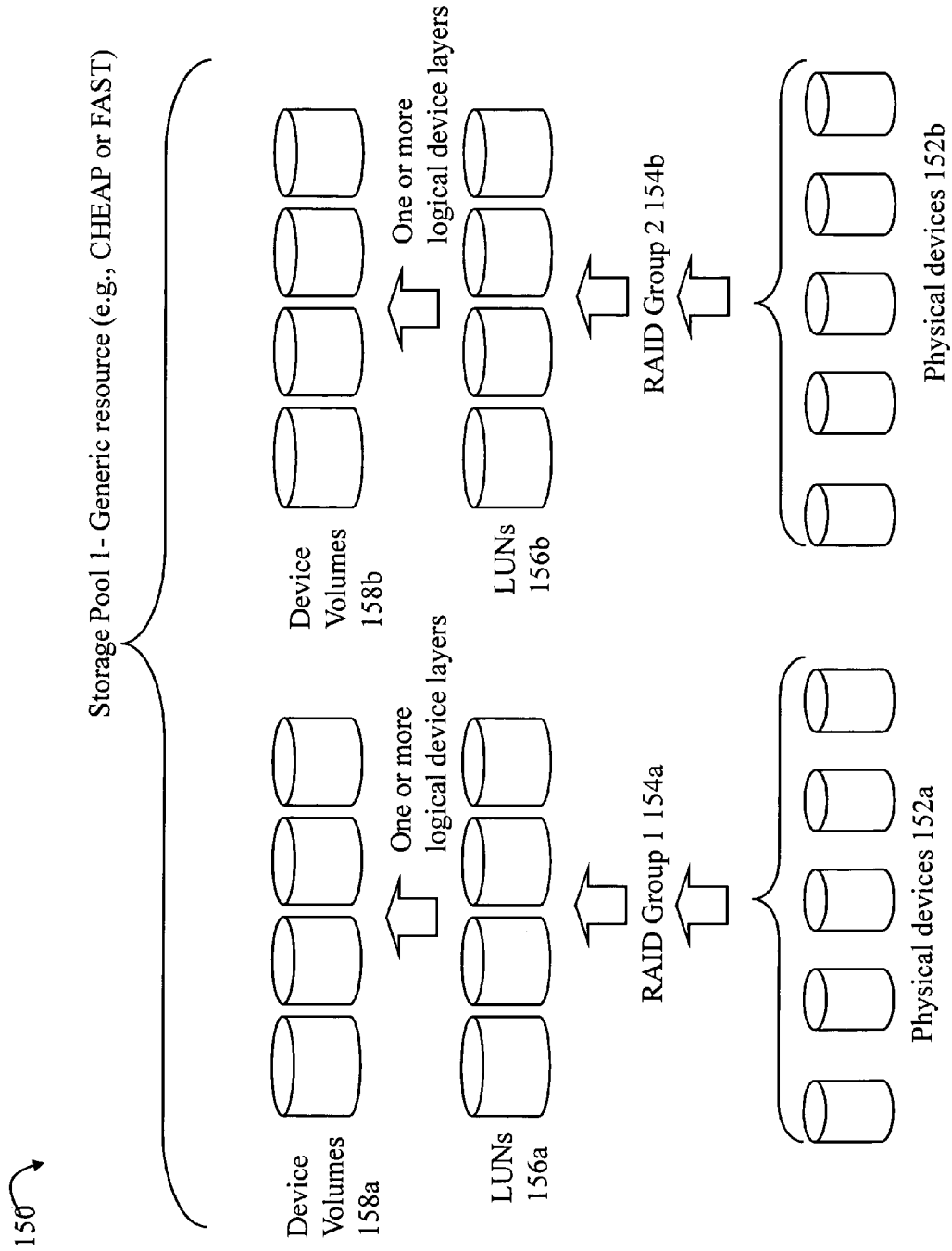
FIG. 3 is an example representation of how storage pools may be configured from physical devices in an embodiment.

Referring to FIG. 3, shown is an example representing how data storage system best practices may be used to form storage pools. The example 150 illustrates how storage pools may be constructed from groups of physical devices. For example, RAID Group 1 154a may be formed from physical devices 152a. The data storage system best practices of a policy may specify the particular RAID level and configuration for the type of storage pool being formed. For example, for physical devices 152a on a first data storage system type when forming a FAST storage pool, RAID-5 may be used in a 4+1 configuration (e.g., 4 data drives and 1 parity drive). The RAID Group 1 154a may provide a number of data storage LUNs 156a. An embodiment may also utilize one or more additional logical device layers on top of the LUNs 156a to form one or more logical device volumes 158a. The particular additional logical device layers used, if any, may vary with the data storage system. It should be noted that there may not be a 1-1 correspondence between the LUNs of 156a and the volumes of 158a. In a similar manner, device volumes 158b may be formed or configured from physical devices 152b. The storage pool 1 of the example 150 illustrates two RAID groups being used to define a single storage pool although, more generally, one or more RAID groups may be used for form a storage pool in an embodiment using RAID techniques.

The data storage system best practices may define how to configure or form the generic storage pools, each storage pool having an associated generic storage pool type. FIG. 3 illustrates one methodology or framework that may be used to form storage pools in an embodiment. In an embodiment following the methodology of FIG. 3, each underlying data storage system may have associated best practices specifying how to configure storage pools formed from physical devices in that particular data storage system. For example, as described elsewhere herein in more detail, different data storage systems may have varying best practices in connection with forming a FAST or CHEAP RAID group.

For purposes of illustration in an example that will now be described, the storage pools used in connection with servicing a provisioning request for storage for an application may be formed prior to the issuance of the provisioning request. However, as will also be described in more detail elsewhere herein, processing performed to configure physical devices into storage pools may be performed at other points in time.

Figure 4:
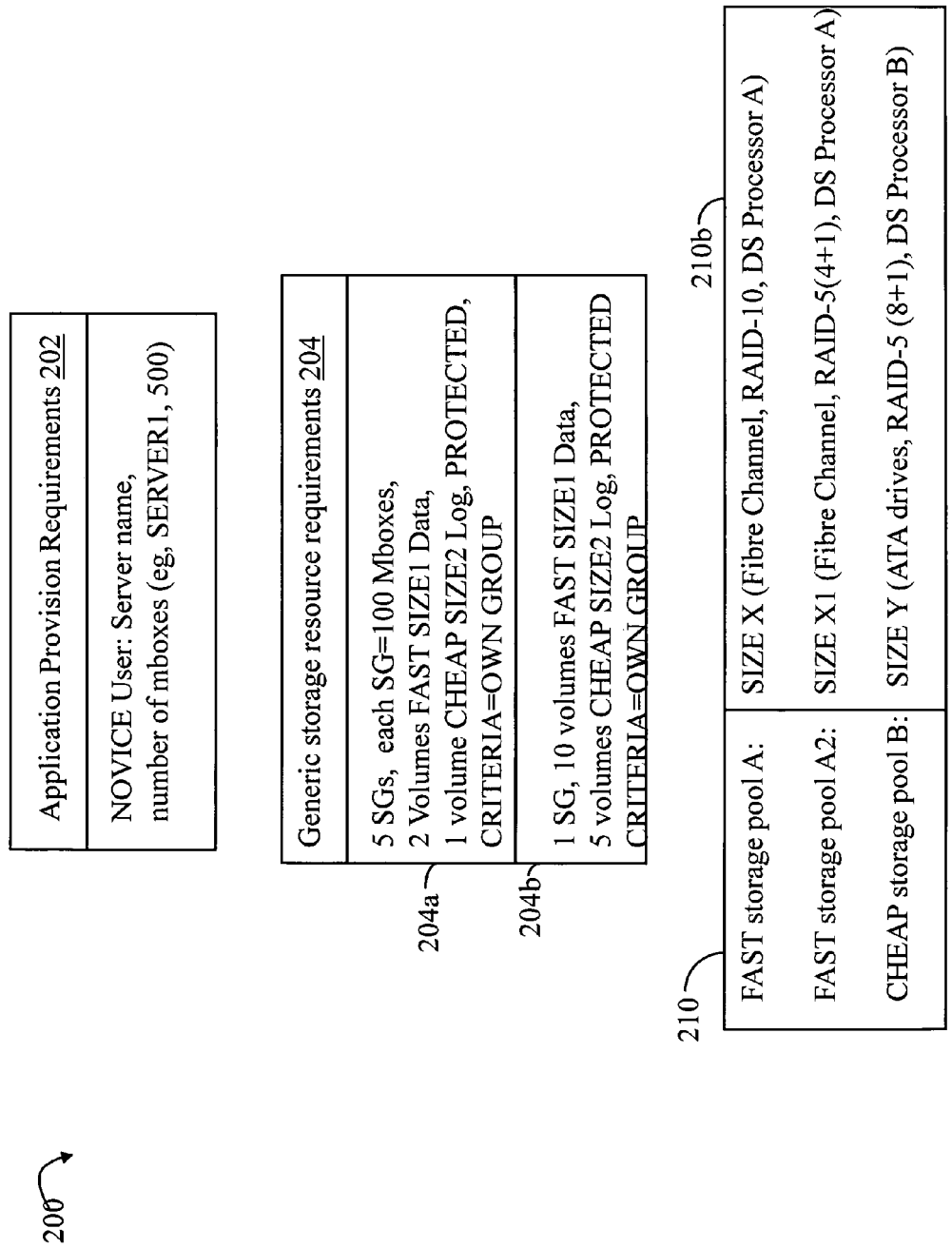
FIGS. 4 and 5 are examples illustrating use of the techniques herein in connection with provisioning storage for an application in an embodiment.

Referring to FIG. 4, shown is an example illustrating use of the techniques herein with the two stage mapping processing as described in connection with FIG. 1. The example 200 includes application provision requirements 202 which are input in connection with a NOVICE user proficiency level for an email application hosting storage on the data storage system. In this example, the requirements of 202 include a server name, such as "SERVER1", and a number of mailboxes, such as 500. The user may be requesting that storage be allocated for 500 mailboxes for use with an email application. The application best practices for the email application may be codified using a script, rules, programming language, and the like, which map the requirements of 202 to the generic storage resource requirements of 204. In this example, the element 204 includes the generic storage resource requirements further annotated with application specific information as will be described in more detail below. In an embodiment, one or more candidate solutions or ways in which the resource provisioning request may be serviced may be specified in terms of the generic resource requirements. The example 200 illustrates two possible or candidate solutions 204a and 204b. For each of these candidate solutions, the currently available resources of the data storage system may be examined to see if the provisioning request may be implemented in accordance with each candidate solution. In other words, each candidate solution specifies amounts and types of data storage needed to fulfill the current provision request. The current state of available resources on the data storage system is examined to determine if it is possible to allocate resources as needed for each candidate solution. It may be that there are insufficient resources available on the data storage system so that one or more candidate solutions are eliminated. In this example, candidate solution 204a indicates that 5 storage groups (SGs) may be formed in which each SG consists of storage for 100 mailboxes. Each SG may include 2 volumes of FAST storage of capacity SIZE1 for storing mail data, and 1 volume of CHEAP storage of capacity SIZE2 for logging purposes. Both of the foregoing are stored on storage which is PROTECTED or provides data protection in the event of device failure. Data protection may be a generic way of specifying some form of data redundancy such as mirroring, or other technique (e.g., RAID protection via parity information) by which data recovery is possible in the event of a data device failure. Candidate solution 204b indicates that a single SG may be formed consisting of storage for all 500 mailboxes. The SG may include 10 volumes of FAST storage of capacity SIZE1 for storing mail data, and 5 volumes of CHEAP storage of capacity SIZE2 for logging purposes. In connection with solution 204b, additional CRITERIA may be specified of OWN GROUP. In one embodiment, OWN GROUP may be used to indicate that the storage allocated for use by the email application should be from a RAID group which does not share storage with any other application. Such criteria may affect the performance of servicing I/O requests for each application hosting data included in the same RAID group. In another embodiment, OWN GROUP may indicate that the data storage in connection with this single provisioning request should be in its own RAID group so that these particular 500 mailboxes do not share a same RAID group with other mailboxes for this email application or another application.

As described above, the first mapping or translation stage 120 may output generic storage resource requirements and also application-specific information as included in 204a and 204b. With reference to 204a, the generic resource requirements may include the following information describing generic storage allocated for each of 5 storage groups (SGs):

2 Volumes FAST SIZE1, 1 volume CHEAP SIZE2, PROTECTED,
CRITERIA=OWN GROUP

In other words, 5 sets of the foregoing generic storage volumes are allocated, each set being associated with storage provisioned for a different SG. The SG associations may be expressed in the application-specific attributes described below.

The remaining information of element 204a may be application specific information. For example, application specific information of 204a may include information regarding the fact that 5 storage groups (SGs) are formed, each SG contains 100 Mboxes (mailboxes), and also that each SG consists of a particular number and type of generic storage volume (e.g., 2 FAST volumes and 1 CHEAP volume). In other words, the SG application-specific attribute may be associated with particular instances of provisioned generic storage. Furthermore, each generic FAST storage volume may be associated with an application specific attribute of "Data" (e.g., an application specific attribute of "Data" occurs in "2 Volumes FAST SIZE1 Data, PROTECTED"). Each generic CHEAP storage volume may be associated with an application specific attribute of "Log" (e.g., an application specific attribute of "Log" occurs in "1 volume CHEAP SIZE2 Log, PROTECTED"). The attributes of Data and Log, along with the SG attribute, may be particular to the email application and used to annotate or further describe information maintained in a data model for other uses such as presenting information on provisioned storage for different applications to a user.

With reference to 204b, the generic resource requirements may include the following information:

10 volumes FAST SIZE1, 5 volumes CHEAP SIZE2, PROTECTED
CRITERIA=OWN GROUP

The remaining information of element 204b may be application specific information. For example, application specific information of 204b may include information regarding the fact that 1 storage groups (SGs) is formed containing all 500 mailboxes and that the single SG consists of particular generic storage data elements such as 10 FAST volumes and 5 CHEAP volumes. Each FAST volume in this example may be associated with an application specific attribute of "Data" (e.g., an application specific attribute of "Data" occurs in "10 Volumes FAST SIZE1 Data, PROTECTED"). Each CHEAP volume in this example may be associated and an application specific attribute of "Log" (e.g., an application specific attribute of "Log" occurs in "5 volumes CHEAP SIZE2 Log, PROTECTED").

Element 210 may represent the different storage pools configured from the physical devices of the data storage system. In other words, element 210 may represent the different storage pools configured from the physical devices as illustrated in FIG. 3 in accordance with data storage system best practices for a currently defined policy. Element 210 includes FAST storage pool A of SIZE X, and FAST storage pool A2 of SIZE X1. Element 210 may also include CHEAP storage pool B of SIZE Y. For purposes of illustration, a policy may be in effect which defines FAST storage as preferably formed from Fibre channel devices with a RAID-10 configuration of pairs of physical devices for mirroring, and CHEAP storage formed from ATA (Advanced Technology Attachment) devices with RAID-5 having 8 data drives and 1 parity drive (8+1). At data storage system startup time, FAST storage pool A and CHEAP storage pool B may be configured. At a first later point in time, 5 more Fibre channel drives may be added to the data storage system for additional storage capacity and processing may be performed to configure these 5 drives into storage pools for use with the techniques herein. In accordance with data storage system best practices, although RAID 10 may be preferred over other RAID levels and configurations, the data storage system best practices may note that 5 drives have been added and thus, to make use of all 5 drives, a RAID 5 configuration of 4 data drives and 1 parity drive may be preferred in this particular instance with the addition of an odd number of 5 drives. As such, the code implementing the data storage system best practices may result in formation of the FAST storage pool A2. It should also be noted in this example that the data storage system for which the foregoing best practices are defined may be a multiprocessor architecture so that a different data storage system processor may be assigned to service I/O requests in accordance with the FAST or CHEAP storage pool type. In this example, data storage system processor A may be used to service I/O requests for the FAST storage pools and processor B may be used to service I/O requests for the CHEAP storage pool. It may known that processor A may be used to only service the FAST storage pool and processor B may used to service the CHEAP storage pool as well as perform other processing tasks in the data storage system. Thus, such a processor assignment may serve as a factor in the I/O processing rate for the FAST storage pools being higher than that associated with the CHEAP storage pool. In connection with 210, FAST storage pool A currently has SIZE X amount of storage capacity available for use, FAST storage pool A2 currently has SIZE X1 amount of storage capacity available for use, and CHEAP storage pool B currently has SIZE Y amount of storage capacity available for use. Additional properties for each storage pool are indicated in area 210b.

For each candidate solution 204a and 204b, the different storage pools, currently available data storage capacity, and associated properties of 210b are examined in accordance with the following for each candidate solution: the type of storage (e.g, FAST or CHEAP), the amount of storage of the different types required to implement the solution, and the other criteria (e.g., OWN GROUP) and other attributes specified (e.g., PROTECTED). For purposes of illustration, let the criteria OWN GROUP mean that the RAID group from which storage is allocated for the current provisioning request should preferably share storage only with other provisioning requests for the same email application. Data storage system best practices may allocate storage from FAST pool A rather than pool A2 if available for a candidate solution since RAID-10 may be preferred over the RAID-5 configuration for performance reasons. In this example, processing of candidate solution 204a may be performed which determines that there is a sufficient amount of FAST storage pool A storage from which the data volumes for 3 SGs may be allocated, a sufficient amount of FAST storage pool A2 from which the data volumes for 2 SGs may be allocated, and a sufficient amount of CHEAP storage pool B from which all log volumes for the 5 SGs may be allocated. Application best practices may be defined so that storage allocated for each SG may be from a different storage'pool however all data volumes for a single SG must belong to the same storage pool and all log volumes for a single SG must belong to the same storage pool. For example, each SG has 2 data volumes and 1 log volume, and storage for both the 2 data volumes may be allocated from either pool A or A2. As a result, the foregoing represents a possible way in which the solution 204a may be implemented given the available data storage system resources and candidate solution 204a storage requirements.

In this example, processing of candidate solution 204b may be performed which determines that there is an insufficient amount of FAST storage pool A storage for storing the data volumes of the single large SG. However, there is a sufficient amount of FAST storage pool A2 from which storage may be allocated for the 10 data volumes of SIZE1, and a sufficient amount of CHEAP storage in pool B from which to allocate storage for the 5 log volumes of SIZE2. As a result, the foregoing represents a possible way in which the solution 204b may be implemented given the available data storage system resources and candidate solution 204b storage requirements. Although both solutions 204a and 204b may be implemented given the currently available resources of the data storage system, solution 204a may be preferred over 204b since 204a is able to utilize at least a portion of the storage from FAST storage pool A. An embodiment may associate a level of fitness with each candidate solution. The level of fitness may be represented as a metric determined using any one or more different heuristics that may be used in an embodiment to rank the candidate solutions. A candidate solution which cannot be implemented in accordance with currently available resources may have an associated metric value of "0". In this example, candidate solution 204a may be ranked higher than solution 204b. A list of one or more candidate solutions which can be implemented in accordance with the currently available data storage system resources may be generated. The list may present to the user one or more solutions from which a user may select a solution for implementation to service the current provisioning request.

It should be noted that the metric indicating the level of fitness associated with each candidate solution may also be presented to the user. In one embodiment, whether the metric is presented or not may depend on the user proficiency level. For example, the metric may not be presented to NOVICE proficiency level users but may be presented along with the possible solutions to the INTERMEDIATE proficiency level user. Additionally, for NOVICE users, an embodiment may perform processing to automatically service the provisioning request with the highest ranked solution set without further interaction with the user. In other words, the NOVICE user may not be presented with a list of candidate solutions 204a and 204b or the associated metric. The INTERMEDIATE user may be presented with a ranked list of candidate solutions and the metric indicating a level of fitness for each solution that can be implemented in accordance with data system resources available. In response, the INTERMEDIATE user may select a solution for implementation.

As a variation to the foregoing, it may be that there is an insufficient amount of FAST storage in pools A and A2 to implement either candidate solution 204a or 204b. Furthermore, in connection with solution 204a, there may be an insufficient amount of storage in pool A and pool A2 to allocate storage for two data volumes for even a single storage group. However, there may be a sufficient amount of CHEAP storage in pool B for allocating all data volumes and all log volumes for solutions 204a and 204b. As a result, an embodiment may also consider variations of the solutions 204a and 204b in which all the data volumes and log volumes may be located in the CHEAP storage pool B. The metrics indicating the level of fitness associated with each the foregoing solutions 204a and 204b when allocating all storage from the CHEAP storage pool B may be less than metric values associated with the foregoing solutions 204a and 204b when allocating data volumes from the FAST storage pools.

As alternative to allocating all storage from the CHEAP storage pool for the NOVICE user, the data storage system may fail to provision storage for the request and output a message that additional FAST storage is needed. The message may recommend adding a number of devices, such as pairs of devices to implement the provisioning request using the preferred RAID 10 implementation in accordance with data storage system best practices. For the INTERMEDIATE user, the user may be presented with the solution sets allocating all storage from the CHEAP storage pool along with a message indicating that there are currently insufficient data storage system resources to satisfy the request in accordance with the recommended types and amounts of FAST and CHEAP storage but that the provisioning request may be satisfied by allocating all from CHEAP storage. The data storage system may also indicate possible penalties or drawbacks in connection with electing to allocate all from CHEAP storage (e.g., performance penalties when accessing email). The INTERMEDIATE user may be given the option of proceeding with the provisioning request by allocating all data and log volumes from CHEAP storage.

As described above, it may not be possible to implement a provisioning request due to insufficient available resources on the data storage system. In such instances, processing may be performed to indicate an error or status and recommend installation of additional storage devices in the data storage system in accordance with best practices. Some of these have been outlined above for the particular example. However, an embodiment may perform other alternatives and processing.

Figure 5:
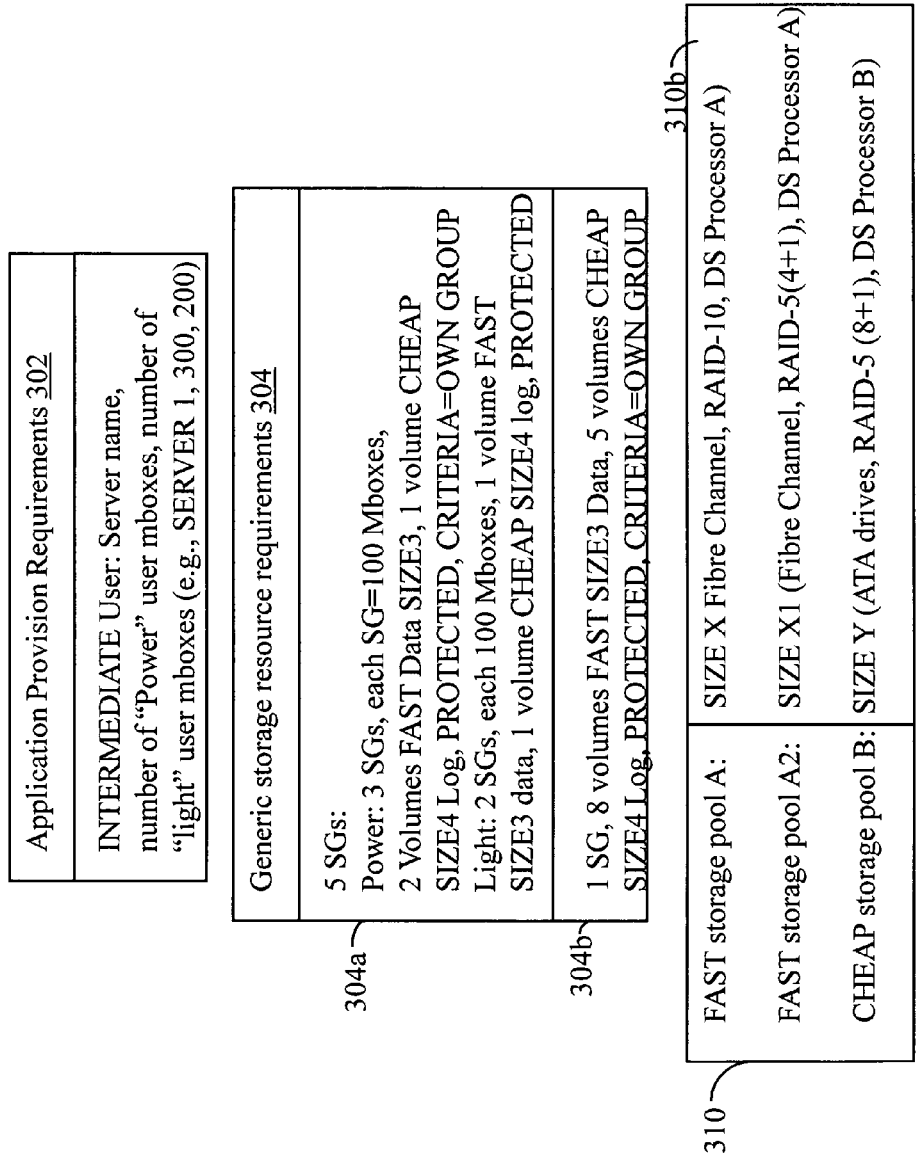

Referring to FIG. 5, shown is an example illustrating use of the techniques herein with the two stage mapping processing as described in connection with FIG. 1. The example 300 illustrates use of application provision requirements for the same email application and same number of mailboxes as in connection with the example 200 of FIG. 4 with the difference that the example 300 illustrates application provision requirements specified for an INTERMEDIATE rather'than a NOVICE user proficiency level. The example 300 includes application provision requirements 302 which are input in connection with an INTERMEDIATE user proficiency level for the email application hosting storage on the data storage system. In this example, the requirements of 302 include a server name, such as "SERVER1", and a number of "power" user mailboxes, such as 300, and a number of "light" user mailboxes, such as 200. A "power" user may be characterized as one who uses email frequently (e.g., throughout each day)

and tends to store a lot of email data. In contrast, a "light" user may be characterized as one who is not expected to store as much data as a power user and may use email on an infrequent basis (e.g., may not even log on every day and does not receive many emails). A user may characterized as light or a power user in accordance with job tasks. As such, power user mailboxes may be allocated more storage for email data than light user mailboxes. Additionally, power users may have a greater performance demand so that power user mailbox data may be stored on a faster device than that of light users and may also be serviced by a processor A having lighter processing load than another processor B. Both processors A and B may be included in a data storage system having a multiprocessor architecture.

In accordance with application best policies, the requirements 302 may be mapped into generic storage requirements 304 resulting in 2 possible candidate solutions 304a and 304b. In this example, the element 304 includes the generic storage resource requirements further annotated with application specific information as will be described in more detail below. Solution 304a specifies 5 SGs with 3 SGs for the power users and 2 SGs for the light users. Each of the 3 SGs for the power users may have 2 FAST data volumes each of SIZE3 and 1 CHEAP log volume of SIZE4. Additionally, the power user SGs include CRITERIA=OWN GROUP which means that the data volumes for the SG cannot be included in a RAID group which shares storage with another application other than the email application. Each of the 2 SGs for the light users may have 1 FAST data volume of SIZE3 and 1 CHEAP log volume of SIZE4. Additionally, the light user SG does not indicate CRITERIA=OWN GROUP. Thus, data volumes holding data for the light user mailboxes may be included in a RAID group which shares storage with another application other than the email application. Solution 304b includes one large SG with all data volumes allocated from FAST storage and all log volumes allocated from CHEAP storage. The CRITERIA=OWN GROUP on solution 304b is as described above in that data volumes may be included in a RAID group having storage allocated for use only with the email application.

As described above, the first mapping or translation stage 120 may output generic storage resource requirements and also application-specific information as included in 304a and 304b. With reference to 304a, the generic resource requirements may include the following information describing generic storage allocated for each of 3 storage groups (SGs) for "Power" users:

2 Volumes FAST SIZE3, 1 volume CHEAP SIZE4, PROTECTED,
CRITERIA=OWN GROUP and generic storage allocated for each of 2 SGs for "Light" users:

1 volume FAST SIZE3, 1 volume CHEAP SIZE4, PROTECTED

The remaining information of element 304a may be application specific information. For example, application specific information of 304a may include information regarding the fact that 5 SGs in total are formed including 3 SGs for Power users and 2 SGs for Light users, each of the 3 Power user SGs contains 100 Mboxes (mailboxes). Each of the 3 Power user SGs consists of a particular number and type of generic storage volumes (e.g., 2 FAST volumes and 1 CHEAP volume). Each of the 2 Light user SGs consists of a particular number and type of generic storage volumes (e.g., 1 FAST volume and 1 CHEAP volume). In other words, the attributes of SG, "Power user", and "Light user" may be associated with particular instances of provisioned generic storage. Furthermore, as described in connection with FIG. 4, the application specific attributes of "Data" and "Log" may be associated with particular generic storage volumes. The attributes of Data, Log, SG, Power user and Light user, may be particular to the email application and used to annotate or further describe information maintained in a data model for other uses such as presenting information on provisioned storage to a user.

With reference to 304b, the generic resource requirements may include the following information describing generic storage allocated for each 1 large SG:

8 volumes FAST SIZE3, 5 volumes CHEAP SIZE4, PROTECTED,
CRITERIA=OWN GROUP

The application-specific information of 304b may include the fact that there is a single SG formed and associated with the foregoing generic storage volumes. Furthermore, the application-specific information in 304b may include use of the application specific attributes of Data and Log wherein the "Data" attribute is associated with each of the 8 FAST generic storage volumes and the "Log" attribute is associated with each of the 5 CHEAP generic storage volumes.

Element 310 indicates the currently available storage in each of the storage pools and is analogous to the information of element 210 of FIG. 4. In connection with solutions 304a and 304b, there may be a sufficient amount of data storage using FAST pool A and CHEAP pool B to implement both solutions 304a and 304b. Solution 304a may be preferred due to application best practices of provisioning resources where possible in accordance with the specified types of power and light email users. As such, solution 304a may receive a higher level of fitness ranking than solution 304b. For the INTERMEDIATE user, a list of solutions 304a and 304 along with a ranking in accordance with level of fitness may be presented. The user may then select one of the solutions for implementation.

Figure 6:
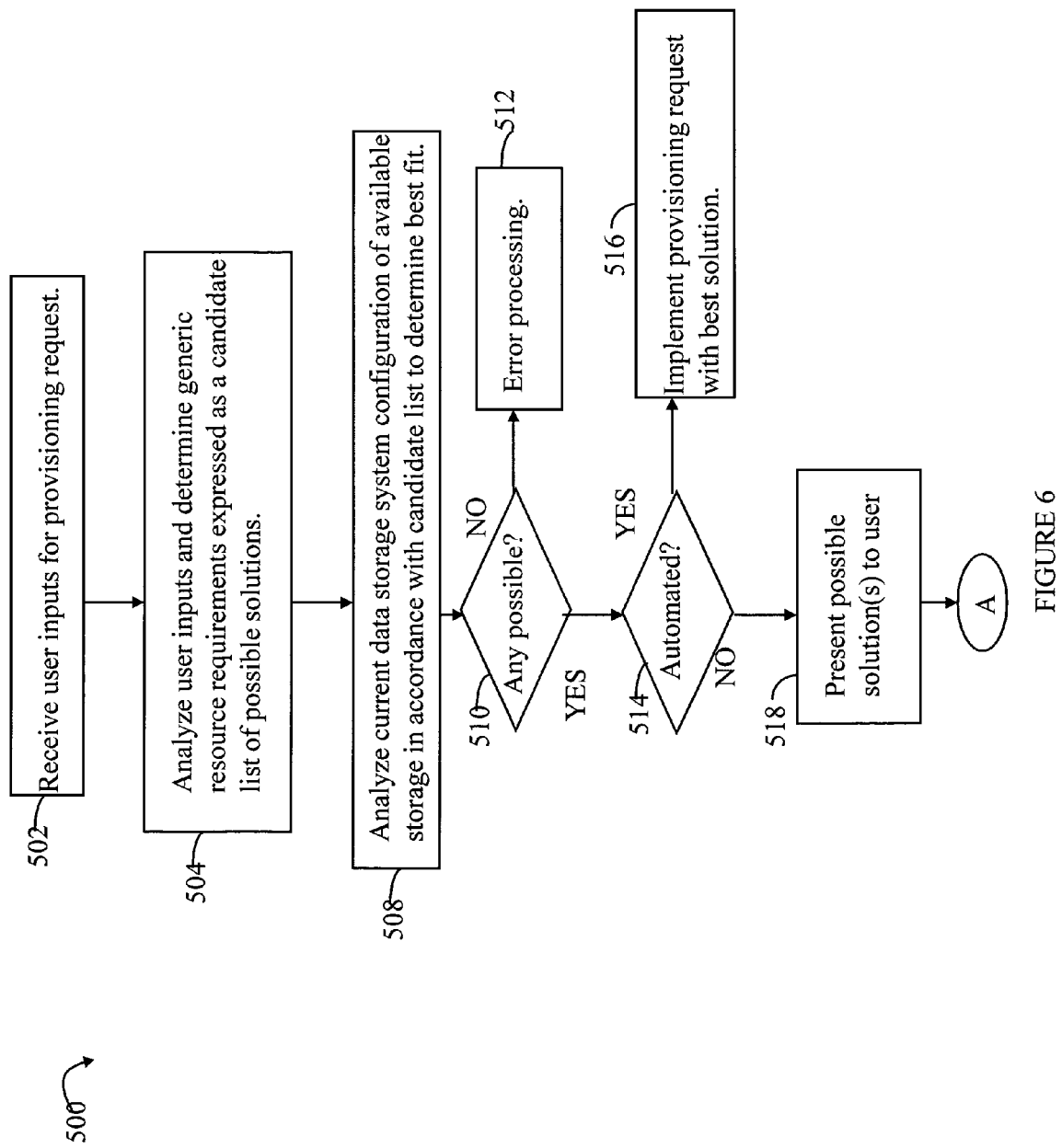
FIGS. 6 and 7 are flowcharts of processing steps that may be performed in connection with the techniques herein for provisioning storage in an embodiment.
Figure 7:
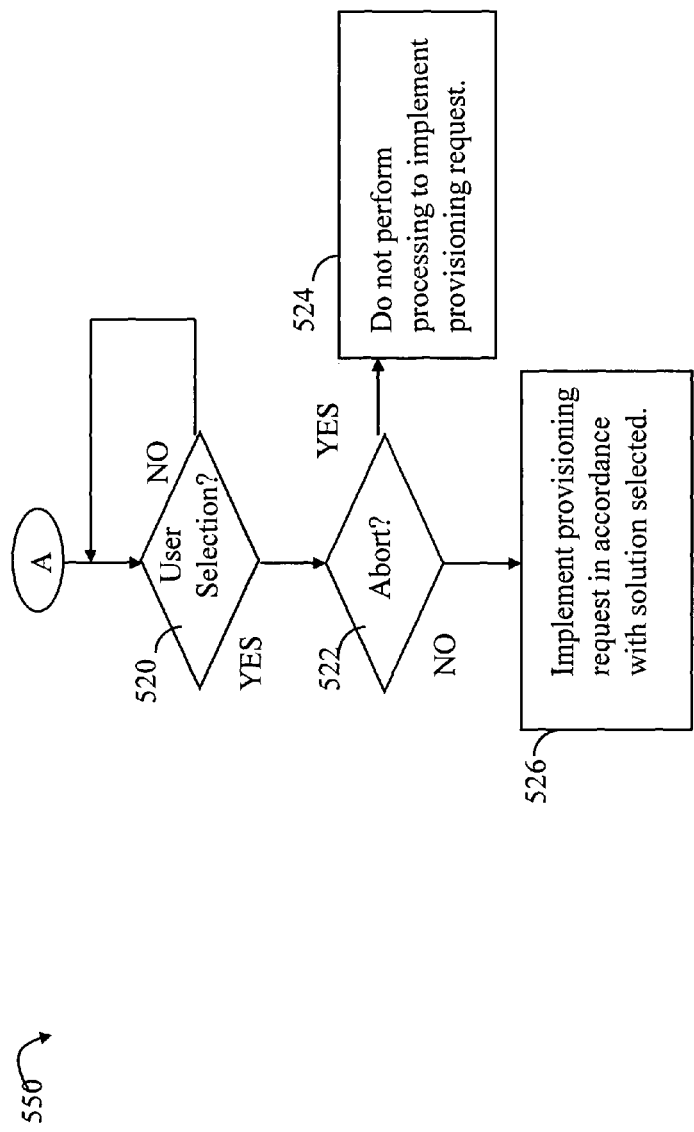

Referring to FIGS. 6 and 7, shown are flowcharts of processing steps that may be performed in an embodiment in connection with the techniques herein for processing a provisioning request for data storage. The processing steps summarize processing as described above. At step 502, the user inputs for the provisioning request are received. Step 502 includes receiving the application provision requirements 102 of FIG. 2 that may vary with application and user proficiency level. At step 504, the user inputs are analyzed in accordance with the application best practices to determine the generic resource requirements. Step 504 includes performing the first mapping or translation stage 120 of FIG. 2. At step 504, a list of one or more candidate solutions may be determined. The list of candidate solutions may include different ways in which the generic resource requirements may be expressed, for example, as illustrated by elements 204a and 204b of FIG. 4 and elements 304a and 304b of FIG. 5. Step 508 analyzes the current data storage system configuration of available storage in accordance with each possible solution of the candidate list to determine which of the candidate solutions can possibly be implemented in accordance with the currently available resources of the data storage system. Additionally as part of step 508, a fitness level or metric may be associated with each candidate solution so that the solutions can be ranked. Such a metric may be used in connection with selecting a best solution from multiple candidate solutions. At step 510, a determination is made as to whether implementation of any candidate solution indicated in the candidate list is possible in accordance with the currently available resources of the data storage system. If step 510 evaluates to no, control proceeds to step 512 to perform error processing. As described above, an embodiment may determine that if a candidate solution cannot be implemented in accordance with the specified storage types (e.g., FAST and CHEAP) and amounts of storage required with the particular characteristics (e.g., PROTECTED attribute and OTHER CRITERIA that may be specified), step 510 may evaluate to NO. As a variation, an embodiment may consider alternatives or acceptable variations to candidate solutions. For example, a candidate solution may specify a first amount of FAST storage and a second amount of CHEAP storage. There may be insufficient resources to obtain the first amount of FAST storage. However, if no other solutions are possible, an embodiment may consider implementing the provisioning request using all CHEAP storage. Whether such a variation is considered and acceptable may vary with an embodiment.

If step 510 evaluates to yes, control proceeds to step 514 where a determination is made as to whether automated processing is performed in connection with implementation of the provisioning request. As described herein, an embodiment may perform such automated processing in accordance with the currently specified user proficiency level, configuration settings or options, and the like. For NOVICE users, the best candidate solution may be selected and automatically implemented without further user interaction. If step 514 evaluates to yes, control proceeds to step 516 to automatically implement the provisioning request in accordance with the best candidate solution from step 508. As described herein, the best solution may be determined in accordance with a fitness level expressed as a metric. If step 514 evaluates to no, control proceeds to step 518 to present the one or more possible candidate solutions which can be implemented to the user. At step 520, processing waits for a user selection. In one embodiment, a user may be presented with the list of candidate solutions which can be implemented and also an option to abort the provisioning request so that no solution is selected. Once a user inputs a selection, control proceeds to step 522. At step 522, a determination is made as to whether there has been a selection to abort the provisioning request. If so, control proceeds to step 524 where no processing is performed to implement the request. If step 522 evaluates to no, control proceeds to step 526 to implement the provisioning request in accordance with the solution selected. Step 526 may include allocating storage from the appropriate storage pools. As will also be described in more detail in following paragraphs, step 526 may include performing other processing including configuring physical devices or RAID groups into storage pools depending on the data storage system policy and state of the data storage system.

As described above, data storage configuration processing in connection with configuring physical data storage devices into storage pools for use with the techniques herein may be performed at various times in the lifecycle of a data storage system. Additionally different degrees or levels of physical data storage device configuration may be performed at different times. To further illustrate, reference is made to FIG. 3. Data storage devices may be configured for use with the techniques herein to form storage pools. Thus, prior to data storage of a physical device of 152a-152b being allocated for use in connection with servicing a provisioning request, the physical device may be associated with a storage pool in accordance with data storage system best practices. There are different points in time at which the physical devices may be configured for use in storage pools. As described above, physical devices may be partitioned and configured into storage pools as part of data storage system initialization or startup. At such a time, the physical devices currently present in the data storage system may be configured into one or more storage pools. As a variation, an embodiment may not configure all physical data storage devices into storage pools as part of startup or initialization processing. Rather, an embodiment may configure a certain amount of storage capacity, number of physical devices, and the like, into storage pools in accordance with a defined policy so that a portion of the physical devices are not associated with a storage pool after data storage initialization processing is complete. As a result, a portion of the physical devices may be configured dynamically or as part of processing a received provisioning request. Such processing may be performed, for example, as part of step 526 processing of FIG. 7 and may allow for configuring the physical devices in accordance with the current provision request. In other words, rather than decide at data storage system initialization time how to configure all available physical devices, a portion of the physical devices may remain unassociated with storage pools so that the portion of physical devices may be so configured in accordance with provision requests actually received. An embodiment may not know at data storage system initialization time how best to configure all the physical devices into storage pools since it may not be known at that time how such data storage may actually be consumed by one or more applications. Binding of a physical device to a storage pool as well as defining which particular data storage processor in a multiple processor data storage system architecture may not be modifiable once specified. As such, an embodiment may choose to form the storage pools and also associate other non-modifiable attributes with data storage at a later point in time.

It should also be noted that an embodiment may elect to partially configure a portion of physical devices in accordance with a data storage system policy. With reference to FIG. 3 beginning at the bottom point or leve, a data storage configuration may include forming RAID groups 154a, 154b from physical devices 152a, 152b, forming data LUNs 156a, 156b from RAID groups 154a, 154b, and forming device volumes 158a, 158b (and other entities associated with the other logical device layers) from LUNs 156a, 156b. As such, physical devices may also be partially configured for use with storage pools by performing configuration processing to one of the foregoing configuration processing points or levels. For example, at data storage system initialization time, a first portion of the physical devices may be configured into storage pools. The remaining portion of physical devices may be configured into RAID groups. However, additional processing to form data LUNs and device volumes from the RAID groups may not be performed until a later point in time such as in connection with processing a provisioning request. Data storage may be first allocated from formed storage pools with the remaining portion of physical devices being configured into the appropriate storage groups as needed in accordance with subsequently received provisioning requests. For example, as storage from a first storage pool is allocated for use with provisioning requests, additional RAID groups may be added to the first storage pool. In one embodiment having a multiprocessor data storage architecture, when RAID groups are configured into, data storage LUNs, a data storage processor may be assigned to service I/O requests for the LUNs. An embodiment may choose to determine which data storage processor services a LUN (e.g., perform the processor-LUN assignment or binding) at a later point in time after the RAID groups are configured in accordance with current load or tasks being performed by each data storage processor. For example, as described elsewhere herein in more detail, the RAID group configuration may be performed as part of initializing the data storage system or when a new device is detected. Performing the processor-LUN assignment, along with other configuration beyond the RAID group formation, may be performed at one or more later points in time, for example, after one or more provisioning requests have been processed.

Thus, based on the foregoing, data storage device configuration, such as performed at data storage system initialization, may be performed in varying degrees or amounts specified in accordance with several aspects. In accordance with a first aspect, a certain amount of the physical devices may be configured into storage pools. The amount may be determined based on a number of physical devices and associated characteristics such as capacity. The amount may be determined based on forming one or more storage pools to have a threshold amount of configured data storage of one or more types (e.g., a first threshold amount of FAST storage, a second threshold amount of CHEAP storage, a number of storage pools of each type FAST and CHEAP, and the like). In accordance with a second aspect, the physical devices may be configured to varying degrees or levels. For example, as part of data storage initialization processing, a first portion of physical devices may be configured into storage pools ready for use in connection with allocation for generic requirements. A second portion of physical devices may only be configured to the RAID group level so that they may be configured at a later point in time into appropriate storage pools, assigned for servicing by a data storage processor, and the like, in accordance with subsequently received provision requests and data storage system state. As an example, the data storage processor which is assigned to service LUN I/O requests may vary in accordance with which processor is more heavily loaded to provide for load balancing. Also, LUNs of FAST storage pools may be assigned to the least or lesser loaded processors.

Storage devices may also be added to the data storage system as additional storage capacity is needed. As such, the subsequently added devices may be configured when added to the data storage system as well as at some point in time after being added but prior to allocating the storage thereof in connection with a provisioning request. In a manner similar to as described above, newly added devices may be completely configured into storage groups when added, or may be partially configured. The newly added devices may be partially configured in accordance with a first aspect as described above by only configuring a portion of physical devices into storage pools. In accordance with another aspect, a newly added device may be partially configured in that a physical device may be configured to the RAID group or other configuration level so that the physical device-storage pool binding is not complete. It should be noted that, with reference to FIG. 3, an embodiment may include other levels or stages in connection with configuring physical devices into storage pools for use with the techniques herein. An embodiment may partially configure one or more physical devices by performing configuration processing to a point, such as associated with level or stage 154, 156, and/or 158. The reasons for performing configuration to a particular level or stage with reference to FIG. 3 may vary with the particular data storage system best practices and policy.

In accordance with the techniques herein, application best practices, and thus the code implementing the same, may change over time. For example, application best practices may be change for a particular application as new features are added, with a software version upgrade, as runtime behavior and application implementation associated with an existing feature changes, as best practices are improved with better ways of implementation, and the like. In connection with a modification to an application best practice, an embodiment implementing such application best practices using a policy may download a new code module, script, and the like, which implements the current application best practices. For example, an updated script or set of rules may be used to define a revised application best practices for an email application. The new script or set of rules may be downloaded to the data storage system, for example, from a vendor or VAR (value added reseller) website or other network location as well as from storage local to the data storage system, such as from a CD, USB or flash memory device, and the like.

In accordance with the techniques herein, a data storage vendor may supply an implementation of data storage system best practices in the form of a policy. Another party, such as a VAR, may supply an implementation of application best practices in the form of a policy for VAR-supplied applications. For example, the VAR may have customers which use a VAR supplied application, such as a medical office application, law office application, dental office application, and the like. The application may be customized or particular to a vertical market, profession, service, and the like. The VAR may supply a script or other code module which implements the application best practices for provisioning storage. Additionally, the VAR may also supply a policy and appropriate configuration settings which allows for automation of best practices and specification of a user proficiency level(s) for the different customers. The policy may also indicate an amount of data storage for which configuration into storage pools is performed or a degree to which data storage devices are configured. The foregoing may be used in connection with initialization processing as well as when new devices are added.

Figure 8:
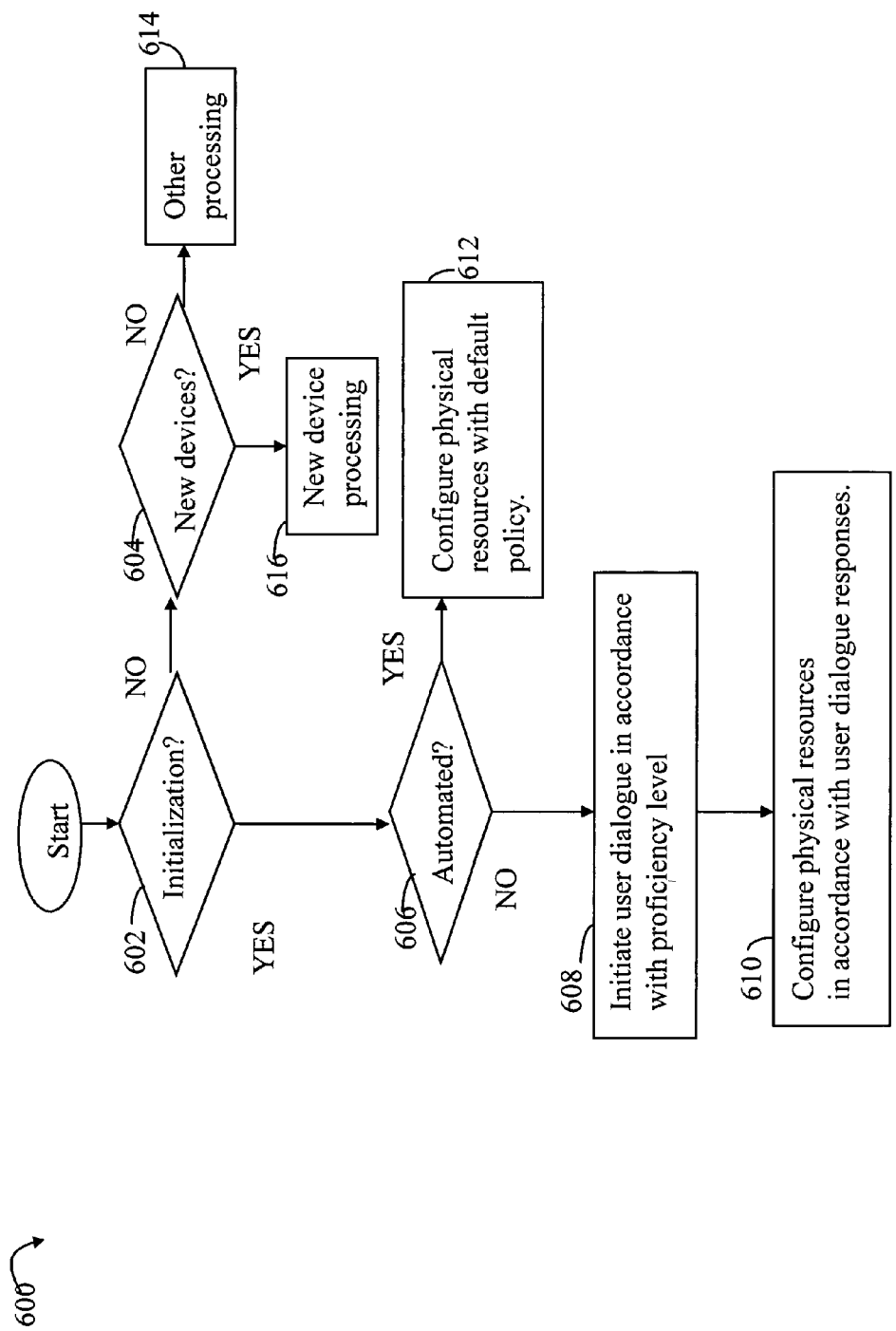
FIGS. 8 and 9 are flowcharts of processing steps that may be performed in connection with the techniques herein when configuring physical storage devices for use in storage pools in an embodiment.

Referring to FIG. 8, shown is a flowchart of processing steps that may be performed in an embodiment in connection with configuring physical storage devices for use with the techniques herein. The flowchart 600 summarizes processing described above as may be performed in an embodiment by code included in a data storage system in connection with configuring physical data storage system devices and resources in accordance with data storage system best practices. The data storage system best practices may be applied at a different point in time independent of when the application best practices are applied. In other words, with reference to FIG. 2, the second mapping or translation process 122 may be applied in flowchart 600 processing (e.g., steps 610 and 612) to configure physical data storage system devices for use with the techniques herein. At step 602, a determination is made by the data storage system as to whether the data storage system is being initialized, for example, as part of starting up the data storage system. Step 602 may evaluate to yes, for example, the first time the data storage system is powered on and the processing steps of 600 may be performed as part of data storage system initialization processing. If step 602 evaluates to yes, control proceeds to step 606 where a determination is made as to whether automated data storage configuration is to be performed. As described herein, a data storage system may have settings or options indicating whether data storage configuration as part of initialization should be performed automatically without user interaction. As an example, automated configuration may be performed if the user proficiency level is indicated as NOVICE. Such an indication may be made via a setting or option by a VAR providing the data storage system to a customer, through a user selected proficiency or interaction level, and the like. If step 606 evaluates to yes, control proceeds to step 612 to automatically configure the physical storage devices in accordance with a default policy. As described herein, a policy may be specified which defines how to form one or more different types of storage pools from physical devices as illustrated in FIG. 3 in accordance with data storage system best practices. For example, a policy may specify how to configure CHEAP and FAST storage pools from physical devices as part of step 612 processing. The policy may also indicate a number or percentage of each of the different types of storage pools which are to be configured from the physical devices. For example, a policy may indicate that 50% of the physical devices are to be configured as FAST storage pools and the remaining 50% are to be configured as CHEAP storage pools. As another example, the policy may indicate that not all of the physical storage devices are to be configured into storage pools. Rather, the policy may indicate that only a portion of the physical devices are to be configured into storage pools as part of step 612 processing with the remaining physical devices being left unconfigured until a later point in time, or configured up to the RAID group level (with reference to FIG. 3). At various later points in time in accordance with the policy, the remaining physical storage devices (or portion thereof) may be configured as part of a storage pool, for example, as additional storage for an existing pool is needed when processing a received provisioning request.

If step 606 evaluates to no, control proceeds to step 608 to initiate a user dialogue. The language of the dialogue, types of questions asked and information presented may vary with a selected or set user proficiency level. The dialogue may proceed to ask the user a series of questions and obtain information used in connection with configuring the physical storage devices. For example, the user dialogue may inquire whether to use the policy defaults regarding portion of storage to be configured into storage pools, percentage of each type of storage pool (e.g, 50% FAST and 50% CHEAP) at data storage system initialization. The user, such as one having an EXPERT user proficiency level, may elect to modify the percentages or amounts directly. As an alternative (e.g., such as with an INTERMEDIATE user level), the dialogue may ask the user a series of questions regarding intended use of the storage such as what particular applications are going to host data on the data storage system, expected usage information for each application, and the like. Such information may be used in connection with determining how to configure the physical storage. For example, if the data storage system will be hosting data only for an email application, a particular database application, and the like, the percentages of the different storage pools types (e.g., FAST and CHEAP) may be adjusted accordingly (e.g., to ratios other than 50% CHEAP and 50% FAST). If the user responds that intended usage is unknown, only a portion of the physical storage devices may be configured into storage pools as part of the initialization processing leaving the remaining physical storage devices for configuration at a later point in time. At step 610, the physical devices of the data storage system are configured in accordance with the responses received in step 608.

If step 602 evaluates to no, control proceeds to step 604 where a determination is made as to whether new devices have been added to the data storage system. If so, step 604 evaluates to yes and control proceeds to step 616 to perform new device processing to configure the new storage devices for use with the techniques herein. Additional detail regarding step 616 that may be performed in an embodiment is set forth in connection with FIG. 9 described below. If step 604 evaluates to no, control proceeds to step 614 to continue with other processing.

Figure 9:
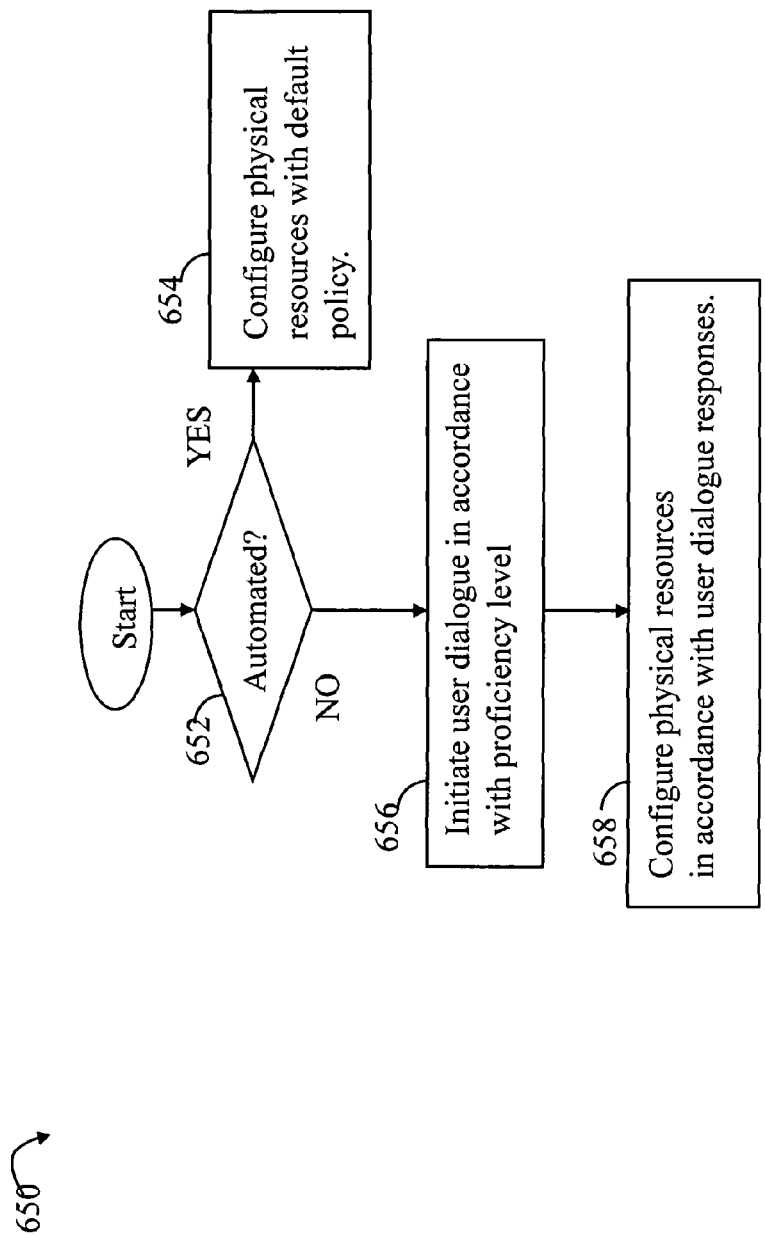

Referring to FIG. 9, shown is a flowchart of processing steps that may be performed in an embodiment in connection with configuring a new storage device. The flowchart 650 sets forth additional processing steps that may be performed in an embodiment in connection with step 616 of FIG. 8. Steps 652, 654, 656, and 658 are respectively analogous to steps 606, 612, 608 and 610 of FIG. 8 with the difference that the processing steps of FIG. 9 are performed with respect to additional storage devices that may be added to a data storage system at a point in time after data storage system initialization. The new storage devices may be added, for example, to expand the storage capacity of an existing data storage system. Processing steps 654 and 658 of FIG. 9 may utilize defined data storage system best practices (e.g., how to configure CHEAP and FAST storage pools for the particular data storage system).

It should be noted that the different ways and variations in which physical devices of the data storage system may be configured, or partially configured, also apply to newly added physical devices.

It should be noted that an embodiment may perform new device processing of FIG. 9 when the addition of new storage devices is detected by the data storage system. Such detection may be performed in an automated fashion by the data storage system. The policy may also specify default values for use in connection with added devices which differ from those values and settings that may be specified for use in connection with initially configuring the devices of the data storage system, such as when the data storage system is first powered on. For example, a policy may indicate that automated configuration of data storage devices is performed at data storage system initialization (e.g., step 606 of FIG. 8 evaluates to yes). However, such automated configuration may not be performed by default for subsequently added devices (e.g., step 656 of FIG. 9 evaluates to no). The user dialogue at step 656 may be initiated when a new device is detected. When a user logs into the data storage system, a visual indicator or message may be presented to the user on a UI indicating that the newly added device needs to be configured. Upon selection of the visual indicator by the user, the dialogue for configuring the newly added devices may be commenced. The user dialogue that may be performed in an embodiment at step 656 may ask questions to determine if storage of the newly added devices should be configured to increase storage of existing storage pools, or to create a new storage pool for use by a new application not currently hosting data on the data storage system. As in connection with the user dialogue of step 608 of FIG. 8, the user dialogue at step 656 may be customized for a particular user proficiency level.

The data storage system best practices may provide a recommendation in connection with newly added devices prior to configuring the new devices. For example, in accordance with a data storage system best practice, a policy may be defined in which a RAID-5 (4+1) configuration may be specified for FAST RAID group configurations. The data storage system may detect the addition of 4 new devices and the user may indicate that he/she wishes to configure storage of the new devices for use as an additional FAST storage RAID group for a new FAST storage pool. Thus, 5 devices may be needed to configure a new FAST RAID group. The data storage system may output a message that the newly added 4 devices cannot be configured for use as a new FAST RAID group unless an additional $5^{th}$ device is added. As an alternative, the data storage system may indicate other ways in which the 4 new physical devices may be configured.

In accordance with techniques and the examples herein, a policy may implement data storage system best practices to define how to form different types of storage pools. For example, a policy may specify how to form FAST and CHEAP storage pools described herein. Several different device and configuration characteristics may be used to configure a type of storage pool. For example, one or more of the following may be used in specifying the data storage system best practices in a policy: RAID-level, number of data and/or disks, drive hardware characteristics (e.g., Fibre channel or ATA drive), whether data is striped, which data storage processor is used to service I/O requests (e.g., may be considered in a multiprocessor data storage system architecture; the selected process may vary with the load on a given processor and desired performance for a storage pool).

It should be noted that a choice of RAID type and configuration may impact the performance of read and write operations. For example, a RAID-5 configuration which uses 4 data drives and 1 parity drive may provide faster write performance than a RAID-5 configuration which uses 8 data drives and 1 parity drive. As such, an embodiment may use RAID-5 (4+1) configuration with FAST storage pools and a RAID-5 (8+1) configuration with CHEAP storage pools. The foregoing data storage system best practices defining CHEAP and FAST may vary with data storage system and associated devices types.

Figure 10:
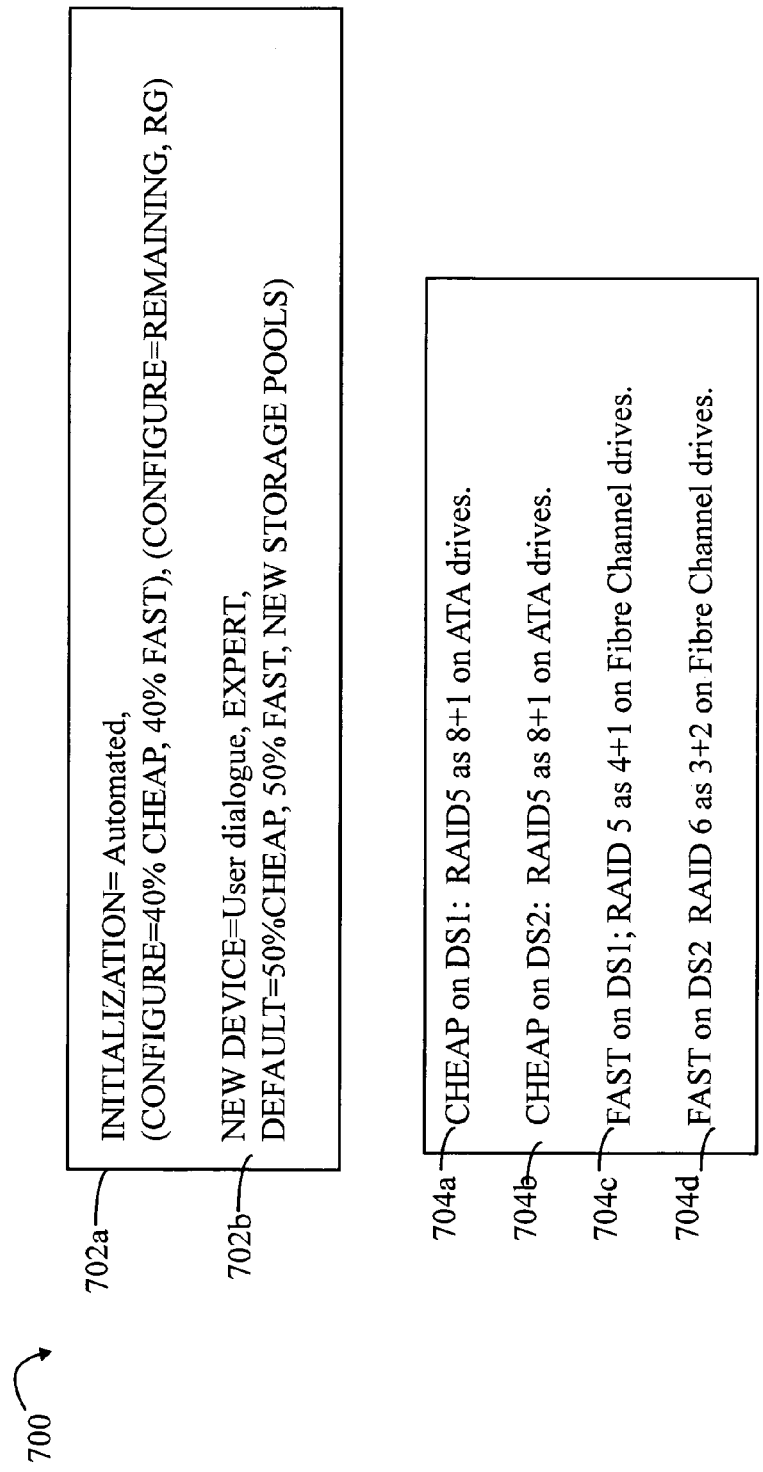
FIGS. 10 and 11 are examples representing information that may be included in a policy in an embodiment using the techniques herein.
Figure 11:
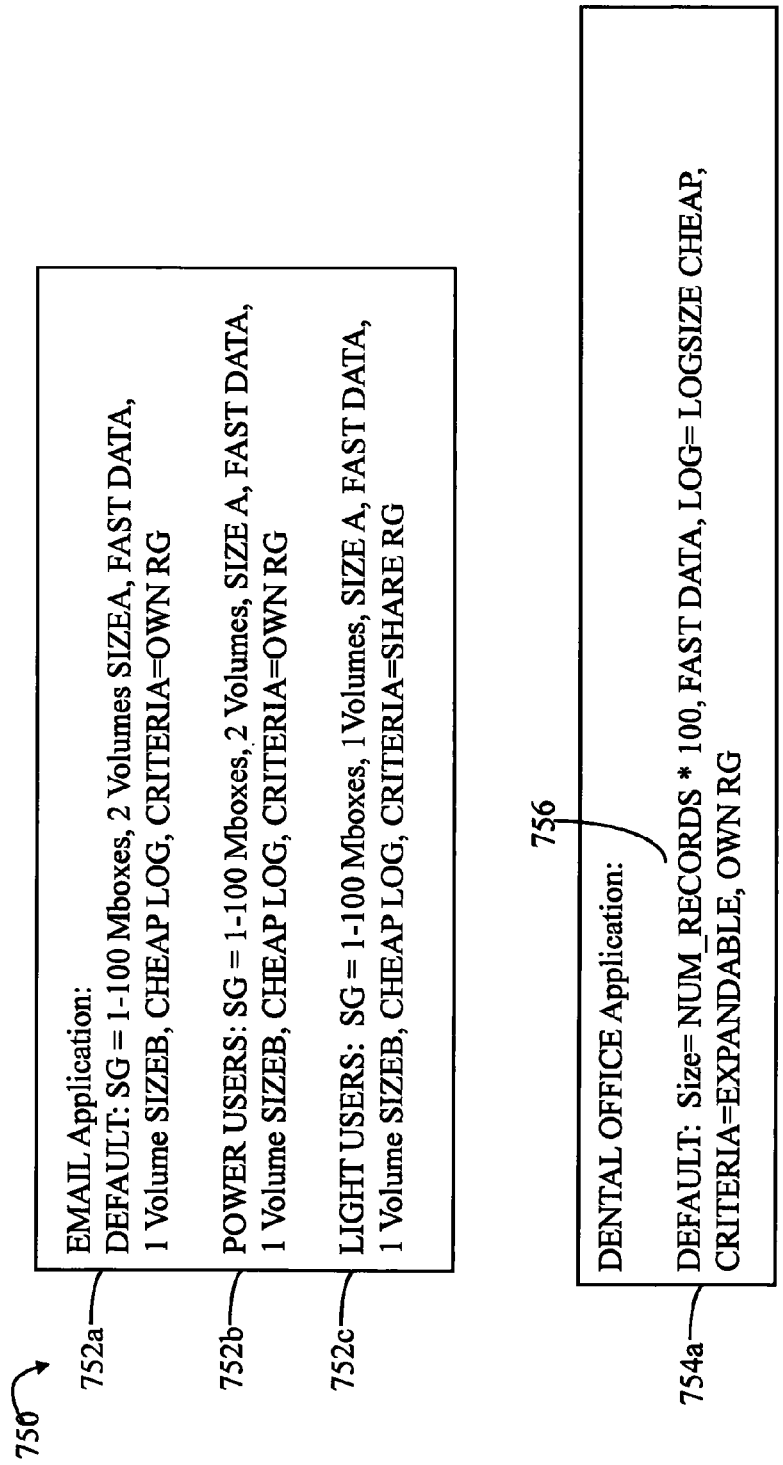

Referring to FIGS. 10 and 11, shown are examples representing information that may be included in a policy in an embodiment. The particular way in which the information is encoded may vary with implementation. With reference to FIG. 10, elements 702a and 702b may specify options for use in connection with configuration of data storage devices at different points in time during the life cycle of the data storage system. Element 702a includes options used in connection with data storage initialization processing, for example, when the data storage system is first powered on. Element 702a indicates that the data storage configuration at initialization time is performed in an automated fashion (e.g., AUTOMATED option) with 40% of the physical storage capacity configured as CHEAP storage pools and 40% of the physical storage capacity configured as FAST storage pools (e.g., CONFIGURE=40% CHEAP, 40% FAST). With reference to FIG. 3, the remaining physical storage capacity is configured up to the RAID group level (e.g., CONFIGURE=REMAINING, RG) and not yet configured into LUNs, storage pools, and the like. Element 702b indicates that the data storage configuration performed when a new device is subsequently added is performed with a user dialogue associated with an EXPERT proficiency level. A default or starting point for new device configuration is specified (e.g., DEFAULT=50% CHEAP, 50% FAST, NEW STORAGE POOLS) where new storage pools may be formed from the newly added storage with 50% forming a new CHEAP storage pool and the remaining 50% forming a new FAST storage pool. The user dialogue in this example may relay the foregoing default configuration to the user and provide the user with an opportunity to modify the percentages or accept the defaults.

Elements 704a and 704c may specify the data storage system best practices included in a policy for a first data storage system type DS1. Element 704a specifies how to configure CHEAP storage pools for data storage system DS1 using a RAID-5 (8+1) configuration with 8 data drives and 1 parity drive with ATA data storage drives. Element 704c specifies how to configure FAST storage pools for data storage system DS1 using a RAID-5 configuration with 4 data drives and 1 parity drive with Fibre Channel storage drives. Elements 704b and 704d may specify the data storage system best practices included in a policy for a second data storage system type DS2. Element 704b specifies how to configure CHEAP storage pools for data storage system DS2 using a RAID 5 (8+1) configuration with ATA data storage drives. Element 704d specifies how to configure FAST storage pools for data storage system DS2 using a RAID-6 (3+2) configuration on Fibre Channel drives.

With reference to FIG. 11, shown are example representations of application best practices for an email application and a dental office application. Elements 752a may indicate defaults used in connection with determining generic storage requirements for a single storage group when a user requests creation of between 1-100 mailboxes. Element 752a may be used in connection with a NOVICE user specifying a number of mailboxes for which a provisioning request is made as described, for example, with reference to FIG. 4. Elements 752b and 752c may be used in connection with determining generic storage requirements for application requirements input from an INTERMEDIATE user issuing a provisioning request as described, for example, with reference to FIG. 5. Element 754a may be used in connection with provisioning storage for a dental office action for a NOVICE user specifying a number of records (NUM_RECORDS 756). Element 754a determines an allocation size or amount of storage as NUM_RECORDS*100 on FAST storage and an amount (LOGSIZE) of CHEAP storage for logging data transactions with the dental office application. The CRITERIA indicates that the storage pools used for the provisioning request should be EXPANDABLE and have sufficient storage available for subsequent provisioning requests. The CRITERIA of OWN RG indicates that the storage provisioned for the dental office application is to be included in a RAID group which is not shared with another application.

Using the techniques herein, the best practices for applications and data storage systems may be codified in any one of a variety of different forms and may be supplied independently of the underlying software installed on the data storage system. A vendor, VAR or other third party may customize scripts or other forms used to implement the application and/or data storage system best practices. The forgoing scripts or other implementation of the best practices may be provided to a customer in a variety of different ways as described herein. A VAR or other party may also customize a codified version of the application or data storage system best practices as well as set other configuration options and defaults for use with the techniques herein by a particular customer. The foregoing may be customized for use by a customer having a particular proficiency level, such as NOVICE, in which the techniques herein may be performed in an automated fashion.

Described herein are techniques for performing resource provisioning based on application best practices automated at varying degrees in accordance with a user proficiency level. The techniques herein may be used to automatically configure and provision storage pools from which generic storage objects, such as volumes, may be created for use in connection with allocating storage for an application. Storage pools may be created, modified and managed in an automated fashion based on best practices for the particular data storage system. Storage pool configuration and provisioning may be performed in a separate stage from the provisioning of resources in connection with an application provisioning request which uses the application best practices. Storage pool configuration and provisioning, such as illustrated in FIG. 3, may also take into account application best practices, for example, by determining how much of particular storage pool types (e.g., FAST and CHEAP) to configure based on what application may use the storage. Storage pools may be configured or formed from physical devices at various points in time during the life cycle of the data storage system and to varying degrees. Physical devices may be configured, completely or partially, for use in storage pools at data storage system initialization, when new storage devices are added, and/or as part of processing in connection with a provisioning request. As described herein, a policy may be a formal description or implementation of best practices. The policy may be applicable for use with different application input requirements that may vary with user level of proficiency. New or updated policies may be provided for use on the data storage system independent of other data storage system software upgrades. Different aspects of the techniques herein, such as user dilogues and varying the degree to which storage provisioning and configuration may be automated, may be in accordance with user proficiency levels.

As will be appreciated by those skilled in the art, the examples described herein may be simplistic for purposes of illustration of the techniques herein. An embodiment may have a greater amount of detail and complexity in order to provide automation of the best practices.

The foregoing provides a flexible approach for automated implementation of best practices that can be customized in accordance with the particular application, data service, and/or data storage system. The best practices may vary with application as well as the particular data storage system. The foregoing describes techniques that may be used to map provision requirements from an application domain to requirements in the storage domain in connection with a two stage mapping or translation process. The input provision requirements in the application domain may be applied and vary with different user proficiency levels. A user may select a level of interaction with the system in which the level selected varies the assumed knowledge or user sophistication, level of detail, and level of automation for the particular application. The user may select a level, such as NOVICE level, to obtain a greater level of automation of best practices customized for the particular application. A user may also select to obtain a lesser level of automation of best practices as the user knowledge level and sophistication increases. The proficiency levels may relate to the different knowledge levels associated with performing data storage management tasks such as provisioning and data storage configuration. The selected level may be associated with a particular user interface, level of automation and interaction with the data storage system for performing data services for a particular application. The automation of the best practices may be implemented using a variety of different frameworks and infrastructures. The ones mentioned herein, such as use of scripts or a rule-based system, are exemplary and it will be appreciated by those skilled in the art that others are possible to implement the techniques set forth herein.

The data storage system may automatically detect that new or updated policies are available. For example, the data storage system may be able to communicate with a network location such as an external website of a vendor and/or VAR website. The data storage system may detect new or updated policies using any one of a variety of different techniques including polling the one or more websites for changes or by having the one or more websites send a notification to the data storage system when new or updated policies are available. When a user logs into the data storage system, the UI may then display an indicator regarding the availability of the new or updated policies. The user may then initiate processing to obtain the new or updated policy in which the data storage system communicates with the external website or other network location. Depending on data storage configuration options, settings, and the like, the foregoing process may be performed automatically without any user interactions as updated or new policies are published. The new or updated policies may also be uploaded from a local storage device on the data storage system. For example, a user may insert a CD, USB device, and the like, containing the updated or new policies. The data storage system may then upload the foregoing policies for use by the data storage system.

In connection with the techniques herein regarding best practices for applications, exemplary applications such as a database application or an email application are illustrated herein although the techniques herein regarding application best practices may be applied with any application. Other applications may include, for example, a web server such as the Apache Web Server (also referred to as the Apache HTTP Server), different business applications such as a spreadsheet, presentation software (e.g., Microsoft® Office PowerPoint®), and word processing software, and different types of virtualization software, such as the VMware ESX Server provided by VMware, Inc. Virtualization software may allow a computer to run multiple operating systems on a single computer system.

An embodiment may implement the techniques herein using code executed by a computer processor. For example, an embodiment may implement the techniques herein using the rules, rules engines, and the like, using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for provisioning storage of a data storage system for use by an application comprising:
   receiving one or more application provision requirements associated with a provisioning request to provision storage for use by the application;
   translating, in accordance with defaults customized for the application included in a policy, the one or more application provision requirements to one or more generic storage resource requirements, wherein said translating of the one or more application provision requirements provides a level of automation in accordance with a user interaction level that is associated with the one or more application provision requirements and indicates a user proficiency level;
   translating, in accordance with data storage system best practices included in said policy, the one or more generic storage resource requirements to one or more physical data storage requirements, wherein said physical data storage requirements include identification of one or more physical storage devices in said data storage system used in allocating storage to service said provisioning request; and
   allocating storage for use by said application in accordance with said physical data storage requirements.

2. The method of claim 1, wherein said policy includes a different set of data storage system best practices for each type of data storage system from which storage can be provisioned.

3. The method of claim 1, wherein said policy includes a different set of defaults customized for each application for which storage can be provisioned.

4. The method of claim 1, wherein said one or more application provision requirements vary in accordance with a user proficiency level.

5. The method of claim 4, wherein said policy includes a first set of one or more application provision requirements associated with a first proficiency level and a second set of one or more application provision requirements associated a second proficiency level.

6. The method of claim 5, wherein said first proficiency level is associated with a greater knowledge level that said second proficiency level and provides a finer granularity of control in connection with said provisioning request.

7. The method of claim 1, wherein said translating the one or more application provision requirements to one or more generic storage resource requirements uses a first set of customized defaults when said provisioning request is for provisioning storage for said first application, and uses a second set of customized defaults when said provisioning request is for provisioning storage for said second application, and wherein said translating the one or more generic storage resource requirements to one or more physical data storage requirements uses a first set of data storage system best practices when said provisioning request is to provision storage for said first application or said second application.

8. The method of claim 1, wherein said policy is a codified implementation used in connection with one or more tasks of data storage configuration for one or more different applications and one or more different types of data storage systems.

9. The method of claim 8, wherein said one or more applications includes one or more of an email application, a database application, an application which is customized for a particular vertical market, a spreadsheet application, a presentation application, a word processor application, a web server application, and virtualization software.

10. The method of claim 4, wherein policy includes a plurality of user proficiency levels each associated with a different set of one or more application provision requirements, said policy mapping each of said different set of one or more application provision requirements to said generic storage resource requirements and providing a different degree of automation of processing said provisioning request in accordance with a user proficiency level associated with said each set of application provision requirements.

11. The method of claim 1, wherein said application provision requirements use application-specific terminology associated with said application.

12. The method of claim 1, further comprising:
detecting, by the data storage system, availability of a new policy at one of an external network location or a local device of the data storage system; and
copying the new policy to the data storage system.

13. The method of claim 1, further comprising:
determining one or more candidate solutions expressed in terms of generic storage resource requirements;
analyzing currently available storage in said data storage system in accordance with said one or more candidate solutions;
determining which of said one or more candidate solutions can be implemented using said currently available storage; and
selecting one of said one or more candidate solutions for implementation to allocate storage for said provisioning request.

14. The method of claim 13, further comprising:
determining a ranking of said one or more candidate solutions, said ranking indicating a level of fitness associated with each of said one or more candidate solutions that can be implemented in accordance with available data storage system resources.

15. The method of claim 14, wherein said selecting is performed automatically without user interaction in accordance with a specified setting used in the data storage system.

16. The method of claim 14, wherein said selecting includes:
displaying information regarding which of said one or more candidate solutions can be implemented along with information regarding said ranking; and
selecting via a user interface one of said solutions for implementation.

17. A computer readable medium comprising executable code stored thereon for provisioning storage of a data storage system for use by an application, the computer readable medium comprising executable code for:
receiving one or more application provision requirements associated with a provisioning request to provision storage for use by the application;
translating, in accordance with defaults customized for the application included in a policy, the one or more application provision requirements to one or more generic storage resource requirements, wherein said translating of the one or more application provision requirements provides a level of automation in accordance with a user interaction level that is associated with the one or more application provision requirements and indicates a user proficiency level;
translating, in accordance with data storage system best practices included in said policy, the one or more generic storage resource requirements to one or more physical data storage requirements, wherein said physical data storage requirements include identification of one or more physical storage devices in said data storage system used in allocating storage to service said provisioning request; and
allocating storage for use by said application in accordance with said physical data storage requirements.

18. The computer readable medium of claim 17, wherein said policy includes a different set of data storage system best practices for each type of data storage system from which storage can be provisioned.

19. The computer readable medium of claim 17, wherein said policy includes a different set of defaults customized for each application for which storage can be provisioned.

20. The computer readable medium of claim 17, wherein said one or more application provision requirements vary in accordance with a user proficiency level and wherein said policy includes a first set of one or more application provision requirements associated with a first proficiency level and a second set of one or more application provision requirements associated a second proficiency level.

* * * * *